United States Patent [19]

Thompson et al.

[11] Patent Number: 4,688,195
[45] Date of Patent: Aug. 18, 1987

[54] NATURAL-LANGUAGE INTERFACE GENERATING SYSTEM

[75] Inventors: Craig W. Thompson, Plano; Kenneth M. Ross, Bedford, both of Tex.

[73] Assignee: Texas Instruments Incorporated, Dallas, Tex.

[21] Appl. No.: 461,881

[22] Filed: Jan. 28, 1983

[51] Int. Cl.⁴ .............................................. G06F 1/00
[52] U.S. Cl. .................................................. 364/300
[58] Field of Search ... 364/200 MS File, 900 MS File, 364/300

[56] References Cited

U.S. PATENT DOCUMENTS 4,460,975  7/1984  Torkelsen et al. .................. 364/900

Primary Examiner—Raulfe B. Zache
Attorney, Agent, or Firm—Kenneth C. Hill; James T. Comfort; Melvin Sharp

[57] ABSTRACT

A system for interactively generating a natural-language input interface, without any computer-skill programming work being required. The natural-language menu interface thus generated provides a menu-selection technique whereby a totally unskilled computer user, who need not even be able to type, can access a relational or hierarchical database, without any possibility of error. That is, the user addresses commands to the database system simply by selecting words from an appropriate menu of words which could legally follow in commands, so that the user inputs commands which are phrased entirely in English, and these commands cannot be misunderstood by the database system. The present invention provides an automatic interactive system whereby such an interface is constructed. The database is itself loaded in, and the interactive interface-construction system then addresses a series of queries to the user's technical expert, in response to which the user must classify, which tables in the database are to be used, which attributes of particular tables in the database are key attributes, and, in particular, what the various connections between tables in the database are and what natural-language connecting phrases will describe those relations.

8 Claims, 11 Drawing Figures

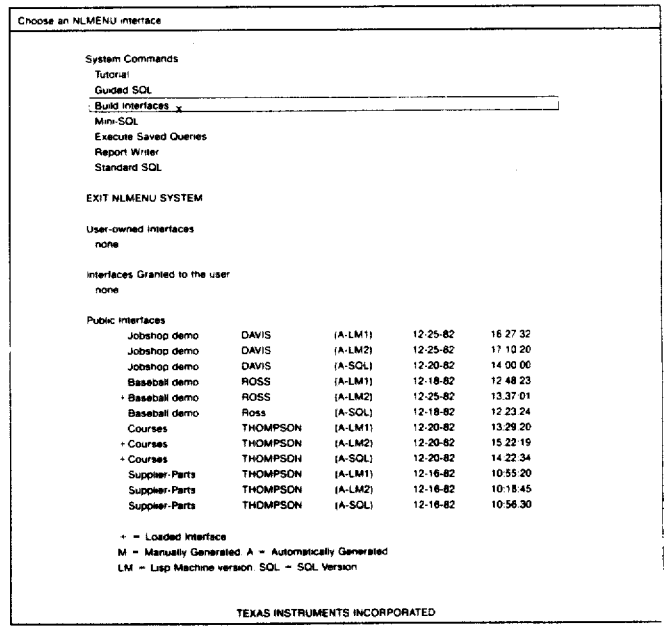

| Choose an NLMENU interface: | | | | |
|---|---|---|---|---|
| System Commands: | | | | |
| Tutorial | | | | |
| Guided SQL | | | | |
| Build Interfaces x | | | | |
| Mini-SQL | | | | |
| Execute Saved Queries | | | | |
| Report Writer | | | | |
| Standard SQL | | | | |
| | | | | |
| EXIT NLMENU SYSTEM | | | | |
| | | | | |
| User-owned Interfaces: | | | | |
| none | | | | |
| | | | | |
| Interfaces Granted to the user: | | | | |
| none | | | | |
| | | | | |
| Public Interfaces: | | | | |
| Jobshop demo | DAVIS | (A-LM1) | 12-25-82 | 16:27:32 |
| Jobshop demo | DAVIS | (A-LM2) | 12-25-82 | 17:10:20 |
| Jobshop demo | DAVIS | (A-SQL) | 12-20-82 | 14:00:00 |
| Baseball demo | ROSS | (A-LM1) | 12-18-82 | 12:48:23 |
| +Baseball demo | ROSS | (A-LM2) | 12-25-82 | 13:37:01 |
| Baseball demo | Ross | (A-SQL) | 12-18-82 | 12:23:24 |
| Courses | THOMPSON | (A-LM1) | 12-20-82 | 13:29:20 |
| +Courses | THOMPSON | (A-LM2) | 12-20-82 | 15:22:19 |
| +Courses | THOMPSON | (A-SQL) | 12-20-82 | 14:22:34 |
| Supplier-Parts | THOMPSON | (A-LM1) | 12-16-82 | 10:55:20 |
| Supplier-Parts | THOMPSON | (A-LM2) | 12-16-82 | 10:18:45 |
| Supplier-Parts | THOMPSON | (A-SQL) | 12-16-82 | 10:56:30 |

+ = Loaded Interface
M = Manually Generated. A = Automatically Generated
LM = Lisp Machine version. SQL = SQL Version

TEXAS INSTRUMENTS INCORPORATED

Fig. 1

| NLMENU interface Build Interfaces | |
|---|---|
| Operations on Interfaces | Specification Categories |
| Tutorial　　　　　List interfaces<br>[Create interfaces]　　Modify interface<br>　　　　　　　x<br>Rename　　　　Combine interfaces<br>Drop interface(s)　　Show portable spec(s)<br>Grant interface(s)　　Revoke interface<br>Commit | (COVERED TABLES)<br>(ACCESS RIGHTS)<br>(CLASSIFY ATTRIBUTES)<br>(IDENTIFYING ATTRIBUTES)<br>(TABLE JOINS) |
| Experts | Operators |
| (new interface name)<br>(existing owned interface name)<br>(existing owned interface(s))<br>(existing droppable interface(s))<br>(existing interface(s))<br>(existing granted interface(s))<br>(users)<br>(granted users) | using<br>by changing<br>giving<br>to<br>to be<br>from |
| Commands | |
| Re-start　　　Rubout　　　　　　　　　　　　　　　　Exit system<br>Refresh　　　Save Q　　　Retrieve Q　　Delete Q　　Play Q | |
| ■ | |

Fig. 2

| NLMENU interface Build Interfaces | |
|---|---|
| Operations on Interfaces | Specification Categories |
| Tutorial    List interfaces<br>Create interfaces    Modify interface<br>Rename    Combine interfaces<br>Drop interface(s)    Show portable spec(s)<br>Grant interface(s)    Revoke interface<br>Commit | (COVERED TABLES)<br>(ACCESS RIGHTS)<br>(CLASSIFY ATTRIBUTES)<br>(IDENTIFYING ATTRIBUTES)<br>(TABLE JOINS) |
| Experts | Operators |
| (new interface name) | using<br>by changing |

Type the name of your new interface:
demonstration

| Commands | | | | |
|---|---|---|---|---|
| Re-start | Rubout | | | Exit system |
| Refresh | Save Q | Retrieve Q | Delete Q | Play Q |
| Create interface | | | | |

*Fig. 3*

| NLMENU interface Build Interfaces | |
|---|---|
| Operations on Interfaces | Specification Categories |
| Tutorial     List interfaces<br>Create interfaces     Modify interface<br>Rename     Combine interfaces<br>Drop interface(s)     Show portable spec(s)<br>Grant interface(s)     Revoke interface<br>Commit | (COVERED TABLES)<br>(ACCESS RIGHTS)<br>(CLASSIFY ATTRIBUTES)<br>(IDENTIFYING ATTRIBUTES)<br>(TABLE JOINS) |
| Experts | Operators |
| (new interface name)<br>(existing owned interface name)<br>(existing owned interface(s))<br>(existing droppable interface(s))<br>(existing interface(s))<br>(existing granted interface(s))<br>(users)<br>(granted users) | using<br>by changing<br>giving<br>to<br>to be<br>from |
| Commands | |
| Re-start    Rubout    Show query    Execute    Exit system<br>Refresh    Save Q    Retrieve Q    Dlt. Q's    Play Q | |
| Create interface demonstration using<br><br>covered tables: (PITCHER TEAM BATTER) ■ | |

*Fig. 4*

| NLMENU interface Build Interfaces | Choose tables you want interface demonstration to cover: |
|---|---|
| Operations on Interfaces | Abort |
| Tutorial     List interfaces<br>Create interfaces     Modify interface<br>Rename     Combine interfaces<br>Drop interface(s)     Show portable spec(s)<br>Grant interface(s)     Revoke interface<br>Commit | [Do It]  x<br>R "SHELTON" BATTER<br>R "SHELTON" BATTER-11<br>R "SHELTON" BATTER-12<br>R "SHELTON" BATTER-13<br>R "SHELTON" BATTER-13<br>R "SHELTON" BATTER-2<br>R "SHELTON" BATTER-3 |
| Experts | R "SHELTON" BATTER-4 |
| (new interface name)<br>(existing owned interface name)<br>(existing owned interface(s))<br>(existing droppable interface(s))<br>(existing interface(s))<br>(existing granted interface(s))<br>(users)<br>(granted users) | R "SHELTON" BATTER-5<br>R "SHELTON" BATTER-6<br>R "SHELTON" BATTER-7<br>R "SHELTON" BATTER-8<br>R "SHELTON" COURSE<br>R "SHELTON" COURSE-2<br>R "SHELTON" INSTRUCTOR<br>R "SHELTON" INTERESTS<br>R "SHELTON" PITCHER |
| Commands | R "SHELTON" PREREQUISITE<br>R "SHELTON" SECTION |
| Re-start     Rubout<br>Refresh     Save Q | R "SHELTON" TEAM<br>R "SHELTON" TEMPREL |
| Create interface demonstration using | R for relations, V for views |

*Fig. 5*

| NLMENU interface Build Interfaces | Choose identifying attributes for interface demonstration |
|---|---|
| Operations on Interfaces<br><br>Tutorial　　　　　List interfaces<br>Create interfaces　　Modify interface<br>Rename　　　　　Combine interfaces<br>Drop interface(s)　　Show portable spec(s)<br>Grant interface(s)　　Revoke interface<br>Commit<br><br>Experts<br><br>(new interface name)<br>(existing owned interface name)<br>(existing owned interface(s))<br>(existing droppable interface(s))<br>(existing interface(s))<br>(existing granted interface(s))<br>(users)<br>(granted users)<br><br>Commands<br><br>Re-start　　　Rubout<br>Refresh　　　Save Q<br><br>Create interface demonstration using<br>　covered tables: (PITCHER TEAM BATTER) | *Abort*<br>[Do It]　x<br><br>R SHELTON.PITCHER<br>SHELTON PITCHER NAME<br>SHELTON PITCHER LEAGUE<br>SHELTON PITCHER TEAM<br>SHELTON PITCHER WINS<br>SHELTON PITCHER LOSSES<br>SHELTON PITCHER ERA<br>SHELTON PITCHER GAMES_PITCHED<br>SHELTON PITCHER COMPLETE_GAMES<br>SHELTON PITCHER INNINGS_PITCHED<br>SHELTON PITCHER HITS_GIVEN_UP<br>SHELTON PITCHER WALKS<br>SHELTON PITCHER STRIKEOUTS<br>SHELTON PITCHER SHUTOUTS<br>SHELTON PITCHER SAVES<br><br>R SHELTON.TEAM<br>SHELTON TEAM NAME<br>SHELTON TEAM LEAGUE<br>SHELTON TEAM AVERAGE<br>SHELTON TEAM GAMES_PLAYED<br>SHELTON TEAM AT_BATS<br>SHELTON TEAM RUNS<br>SHELTON TEAM HITS<br>SHELTON TEAM DOUBLES<br>SHELTON TEAM TRIPLES<br>SHELTON TEAM HOMERUNS<br>SHELTON TEAM STEALS<br>SHELTON TEAM SHUT_OUT_BY_OTHERS<br>SHELTON TEAM ERA<br>SHELTON TEAM COMPLETE_GAMES<br>SHELTON TEAM INNINGS_PITCHED<br>SHELTON TEAM HITS_GIVEN_UP<br>SHELTON TEAM RUNS_GIVEN_UP<br>SHELTON TEAM WALKS<br>SHELTON TEAM STRIKEOUTS<br>SHELTON TEAM SHUTOUTS<br>SHELTON TEAM SAVES<br><br>R SHELTON.BATTER<br>SHELTON BATTER NAME<br>SHELTON BATTER LEAGUE<br>SHELTON BATTER TEAM<br>SHELTON BATTER AVERAGE<br>SHELTON BATTER GAMES_PLAYED<br>SHELTON BATTER AT_BATS<br>SHELTON BATTER RUNS<br>SHELTON BATTER HITS<br>SHELTON BATTER DOUBLES<br>SHELTON BATTER TRIPLES<br>SHELTON BATTER HOMERUNS<br>SHELTON BATTER RBIS<br>SHELTON BATTER STEALS |

*Fig. 6*

| NLMENU interface Build Interfaces |||||||
|---|---|---|---|---|---|---|
| Ops | Choose access rights | retrieval | insertion | deletion | modification | all rights | don't display |
| | R SHELTON.PITCHER | ☒ | ☐ | ☐ | ☒ | ☐ | ☐ |
| | R SHELTON.TEAM | ☒ | ☒ | ☒ | ☐ | ☐ | ☐ |
| | R SHELTON.BATTER | ☒ | ☐ | ☐ | ☐ | ☐ | ☐ |
| | DO IT ☒ | | | ABORT ☐ ||||
| | Grant interface(s)    Revoke interface <br> Commit | | (TABLE JOINS) |||||
| Experts | | Operators ||||||
| | (new interface name) <br> (existing owned interface name) <br> (existing owned interface(s)) <br> (existing droppable interface(s)) <br> (existing interface(s)) <br> (existing granted interface(s)) <br> (users) <br> (granted users) | | using <br> by changing <br> giving <br> to <br> to be <br> from ||||
| Commands |||||||
| | Re-start    Rubout    Show query    Execute    Exit system <br> Refresh    Save Q    Retrieve Q    Dlt. Q's    Play Q ||||||
| Create interface demonstration using <br><br>    covered tables: (PITCHER TEAM BATTER) <br><br>    identifying attributes: ((PITCHER NAME LEAGUE TEAM) (TEAM NAME LEAGUE) <br> (BATTER NAME LEAGUE TEAM)) ■ |||||||
| ■ |||||||

*Fig. 7*

| NLMENU interface Build Interfac | Classify attributes for interface demonstration | |
|---|---|---|
| Operations on Interfaces | Top | |
|    Tutorial                L<br>   Create interfaces     Mo<br>   Rename            Com<br>   Drop interface(s)    Show<br>   Grant interface(s)   Re<br>   Commit | R SHELTON.PITCHER<br>NAME: non-numeric numeric computable don't include<br>LEAGUE: non-numeric numeric computable don't include<br>TEAM: non-numeric numeric computable don't include<br>WINS: non-numeric numeric computable don't include<br>LOSSES: non-numeric numeric computable don't include<br>ERA: non-numeric numeric computable don't include<br>GAMES_PITCHED: non-numeric numeric computable don't include<br>COMPLETE_GAMES: non-numeric numeric computable don't include | |
| Experts | INNINGS_PITCHED: non-numeric numeric computable don't include<br>HITS_HIVEN_UP: non-numeric numeric computable don't include<br>WALKS: non-numeric numeric computable don't include<br>STRIKEOUTS: non-numeric numeric computable don't include<br>SHUTOUTS: non-numeric numeric computable don't include<br>SAVES: non-numeric numeric computable don't include | |
| (new interface name)<br>(existing owned interface<br>(existing owned interfac<br>(existing droppable interfa<br>(existing interface(s))<br>(existing granted interfac<br>(users)<br>(granted users) | R SHELTON.TEAM<br>NAME: non-numeric numeric computable don't include<br>LEAGUE: non-numeric numeric computable don't include<br>AVERAGE: non-numeric numeric computable don't include<br>GAMES_PLAYED: non-numeric numeric computable don't include<br>AT_BATS: non-numeric numeric computable don't include<br>RUNS: non-numeric numeric computable don't include<br>HITS: non-numeric numeric computable don't include | |
| Commands | | |
| Re-start     Rubout<br>Refresh     Save Q | More below | tem Q |
| | Exit | |

Create interface demonstration using covered tables: (PITCHER TEAM BATTER)

identifying attributes: ((PITCHER NAME LEAGUE TEAM) (TEAM NAME LEAGUE)
(BATTER NAME LEAGUE TEAM))

access rights:
   retrieval: (BATTER TEAM PITCHER)
   insertion: (TEAM)
   deletion: (TEAM)
   modification: (PITCHER) ∎

*Fig.8*

| Specify Joins ■ | | |
|---|---|---|
| Add a new Two Table join | Add a new Three Table join | |
| Abort<br><br>Use<br>(active phrase)<br>and<br>(passive phrase)<br>to join<br>(table 1)<br>and<br>(table 2)<br>using<br>(table 1 attributes)<br>and<br>(table 2 attributes) | Abort<br><br>Use<br>(active phrase)<br>and<br>(passive phrase)<br>to join<br>(table 1)<br>and<br>(table 2)<br>using<br>(table 1 attributes)<br>and<br>(table 2 attributes)<br>and<br>to join<br>(table 2)<br>and<br>(table 3)<br>using<br>(table 2 attributes)<br>and<br>(table 3 attributes) | BLES)<br>HTS)<br>BUTES)<br>RIBUTES)<br>WS)<br><br><br><br>Exit system<br>Play Q |
| Exit | Abort | |
| Delete one or more Table Joins | | |
| Two way joins:<br><br>Two way joins: | | EAGUE)<br><br><br><br>BLES<br><br>TS<br>HITS<br><br>GAMES<br><br>E AT_BATS |

*Fig. 9*

| Specify Joins ■ | | |
|---|---|---|
| Add a new Two Table join | Add a new Three Table join | |
| Abort<br><br>Use<br>"who play for"<br>and<br>(passive phrase)<br>to join<br>(table 1)<br>and<br>(table 2) | Abort<br><br>Use<br>(active phrase)<br>and<br>(passive phrase)<br>to join<br>(table 1)<br>and<br>(table 2) | BLES)<br>HTS)<br>BUTES)<br>RIBUTES)<br>WS) |
| | (table 2 attributes<br>and<br>(table 3 attributes) | Exit system<br>Play Q |
| Exit | Abort | |
| Delete one or more Table Joins | | |
| Two way joins:<br><br>Two way joins: | | EAGUE)<br><br><br><br><br>BLES<br><br>TS<br>HITS<br><br>GAMES<br><br>E AT_BATS |

Overlay dialog:
Type a joining phrase, followed by ⟨cr⟩:
(Ex You might type "which are supplied by"
if you are joining PARTS to SUPPLIERS)
whose players are

Fig. 10

| Specify Joins ■ | | |
|---|---|---|
| Add a new Two Table join | Add a new Three Table join | |
| [Do it] x<br>Abort<br><br>Use<br>"who play for"<br>and<br>"whose players are"<br>to join<br>BATTER<br>and<br>TEAM<br>using<br>(TEAM)<br>and<br>(NAME) | Abort<br><br>Use<br>(active phrase)<br>and<br>(passive phrase)<br>to join<br>(table 1)<br>and<br>(table 2)<br>using<br>(table 1 attributes)<br>and<br>(table 2 attributes)<br>and<br>to join<br>(table 2)<br>and<br>(table 3)<br>using<br>(table 2 attributes)<br>and<br>(table 3 attributes) | BLES)<br>HTS)<br>BUTES)<br>RIBUTES)<br>WS)<br><br><br><br><br><br><br>Exit system<br>Play Q |
| Exit | Abort | |
| Delete one or more Table Joins | | |
| Two way joins:<br><br>Two way joins: | | EAGUE).<br><br><br><br><br>BLES<br><br>TS<br>HITS<br><br>GAMES<br><br>E AT_BATS |

*Fig.11*

NATURAL-LANGUAGE INTERFACE GENERATING SYSTEM

Included is a microfiche appendix of 4 microfiche and 385 frames

BACKGROUND AND SUMMARY OF THE INVENTION

The present invention relates to a system for user-customizing a natural language menu command system.

In general, the task of writing a natural language interface to some target computer system involves writing a natural language grammar and a corresponding lexicon and a set of semantic translations to the target system. This process has traditionally been a manual one requiring a grammar specialist and weeks or months or even years or work. Furthermore, the interface that results is not portable to new domains, not robust with respect to changes in the target system, not easy to debug, and may not cover the target system (a proof that it does so may be extremely difficult). The invention described here automates the process of generating an interface in the special case of relational databases and in the context of a menu-based natural language understanding system. In essence, the invention involves parameterizing a core grammar, lexicon and set of translations so that the user specifies only information that includes what database tables (relations and views) he wants covered, what table access rights (retrieved, insert, ... ) the interface should allow, what joins he wants the grammar to explicitly support, what attributes are numeric and computable, etc.

The ADVANTAGES of this invention are that an end user can construct his own interface knowing nothing about grammars and lexicons so no specialist is required. The process of specifying the parameters to the MAKE-PORTABLE-INTERFACE routine takes minutes, not weeks or months. The technique is portable across domains. The user can control precisely what tables to include, etc and so can control the coverage of the natural language interface. The interface is easy to change if the user changes table descriptions or adds or deletes tables. Finally, a given core grammar can be constructed to probably cover any subportion of a target relational database interface language. And it can be guaranteed to be bug-free, since it is easy to validate the parameters to the MAKE-PORTABLE-INTERFACE routine and prove it correct.

The significance of this invention is that it makes it possible, for a MUCH broader class of users and applications, to use menu-based natural language interfaces to databases.

Natural language interfaces to computer systems are not in common use today for two main reasons: they are difficult to use and expensive to build and maintain. A companion patent application described a particular grammar-driven, menu-based software tool which, when used with a semantic grammar and lexicon allows a naive user to construct understandable sentences using a pointing device. That patent application solves many of the problems having to do with "ease-of-use" of natural language interfaces. The present invention solves the second problem, of making natural language interfaces easy to build and maintain, in the very important special case of relational databases and in the context of a grammar-driven, menu-based interface drive. (The technique can be generalized to non-relational database applications and probably to applications other than database applications.

Specifically, this invention addresses the following problems: Existing natural language interfaces to databases are seldom portable; almost all are application-specific. They take from man-weeks to man-years for a specialist to build. They are not robust with regard to changes in the data they are interfacing to. They are hard to debug. And there is no established way to guarantee that they cover the desired data or fit the functionality of the target computer system. So, using existing technology, natural language interfaces to databases will be built only for important database applications. These problems will haunt even NLMENU-driven, manually constructed interfaces, though, because simpler grammars can be used, a grammar specialist should be able to complete an interface in a few weeks, (but he would still be required to maintain the interface when changes occurred to the structure of the database).

The invention described here solves the problems listed above. END-USERS can build natural language interfaces to their own data; the interfaces are robust with respect to database changes; they can be customized to cover user-specified subsets of data and functionality in a precise manner; and they are provably correct.

In this section we will briefly discuss the general state of natural language interfaces to software systems and database systems in particular. Then we will briefly discuss menu-based grammar-driven interfaces. Then we will relate these to the invention and discuss known prior art as it concerns automatically generating interfaces to a database.

INTRODUCTION

Natural language interfaces to software fall into two categories: (1) those based on pseudo-English, where a user must learn a command language that is English-like. COBOL is a well-known computer language that employs some pseudo-English. (2) Those based on the premise that a user should be allowed to express himself in any way that is natural to him and that the system will make sense of his input. Keyword extraction techniques suffice only in simple applications. But for most other purposes, the user's natural language input must be better understood.

Natural language interfaces to computer systems that have been constructed employ a grammar which characterizes the set of acceptable input strings. A parser then access this grammar to produce a parse tree (parse trees for ambiguous input) for the input string. The parse tree is then translated into an expression (or set of expressions) which represent the meaning of the input string and which are interpretable by the target computer system for which the interface is being built. A wide variety of grammar formalisms and parsing strategies have been developed.

For all natural language systems, the user is required to type his question using the keyboard of a computer terminal. When the entire query has been received, the natural language interface processes the input. Processing typically results in either an answer to the user's query or a response indicating that the query was not well-understood.

Most natural language interfaces to database systems have been prototypes, built by the research community. The primary application for natural language interfaces has been to natural language database query systems.

Some of these prototype systems include the LUNAR system (Woods et al. 1972), the PLANES system (Waltz and Goodman, 1977), the LADDER system (Hendrix, 1978), and the TQA system (Petrick, 1981). Some commercial systems exist. Larry Harris of Artificial Intelligence Corp, Roger Schank of Cognitive Systems Inc, and Gary Hendrix of Symantec are all marketing natural language interfaces to software systems.

Natural language systems are not in wide spread use today for two reasons: current systems are not easy to use nor are they easy to build and maintain.

Tennant's dissertation (1980) explores why current natural language systems are not easy to use. Tennant performed the first and only extensive evaluation of a natural language interface. In his evaluation of the PLANES system, he found that only simple queries of 6 or 7 words were input to the system and ⅓ of the queries were not understood by the system. The results showed clearly why natural language interfaces are not in wide-spread use today.

Some of the problems involving "ease of use" of natural language interfaces are:

users type poorly and often use ungrammatical constructions.—users had no way of knowing the grammatical coverage of the system (what constructions were allowed in its grammar) and they had no clear path to learn such limitations.

users had no way of knowing the semantic coverage of the system (which attributes, entities, and relationships the system knew about) and again they had no clear path to learn about the system's limitations (what kinds of things it di and did not know about).

Traditional techniques for handling these difficulties involved spelling correctors and very large grammars and lexicons, but Tennant's dissertation shows how unsuccessful these techniques have been.

The companion patent by Tennant, Ross, and Saenz describes an invention that overcomes the difficulties involving "ease of use" of natural language interfaces (and also formal language interfaces—see next subsection).

The second reason why natural language interfaces to databases are not in common use today is the large amount of time it has traditionally taken to construct a natural language interface. Current technology is such that each interface must be constructed on a case by case basis for each application. Efforts taking from 10 to 30 man-years per application are not uncommon. Thus, only applications that can justify such large expenditure of manpower are candidate for possible applications. However, given the quality of the system that results, the effort has not proven to be worthwhile.

This patent application describes an invention, which is dependent on a grammar-driven, menu-based interface driver, which solves the problems involving ease of building and maintaining natural language interfaces to databases.

MENU-BASED, GRAMMAR DRIVEN NATURAL LANGUAGE INTERFACES. The companion application (simultaneously-filed U.S. patent application Ser. No. 462,151, filed Jan. 28, 1983, which is hereby incorporated by reference, describes an interface driver (hereinafter called the NLMENU driver) that parses a user's input phrase by phrase, at every point offering him one or more menus from which to select sentence completions, so that only syntactically well-formed strings can be constructed. This guarantees grammatical coverage. A "semantic grammar" (a context-free grammar that encodes the semantics of the domain) (Burton, 1976) is used to guarantee semantic coverge. An all-paths, predictive parser interprets the grammar and is used to control what menu selections are available to a user at any point in the construction of sentences. A pointing device (or selection from a keyboard) is used to make the selections of completing phrases from a menu or menus. So an NLMENU-driven interface answers the set of objections to natural language interfaces that involve "ease of use" of the interface. One additional advantage of the NLMENU-driven interfaces is that only one or a few ways are needed to state a natural language command, instead of an arbitrarily large grammar that covers every construction that every user is likely to use including ungrammatical ones. So the grammar can be small.

The companion patent application actually describes a particular kind of grammar-driven, menu-based interface system in which a set of menus permanently resides on the screen of a CRT and menus that the user can choose from are hilighted in some way and constrained to contain only next legal choices. Unhilighted menus contain all menu choices for the menu category to indicate the scope of the interface to the user at all times. This interface is really a special case of grammar-driven, menu-based interfaces. Another particular and successful grammar-driven, not quite menu-based interface is DEC 2060 command language-like interface (TOPS-20, 1980), where a user types enough of a phrase to disambiguate it and asks the system for completion and at any point in stating a command, he can use "?" to ask for a menu-like list of next phrases.

The companion patent application is only a natural language interface if it is used with a natural language grammar and lexicon. It can equally well be used with formal natural languages like the database query language SQL, and in fact the DSG product to be released on Feb. 1, 1982, will feature a GUIDED-SQL interface that uses exactly the same driving software but a different grammar and lexicon. This point is significant since it widens the scope of the usefulness of that patent. It happens though that many advantages (noted above) accrue from using natural language grammars and lexicons with that NLMENU interface driver.

The above sections indicate that in the past, it has been expensive to build and maintain natural language interfaces to databases. This invention solves that problem for relational databases, but only in the context of some grammar-driven, menu-based driver. The grammars and lexicons produced by the MAKE-PORTABLE-INTERFACE function are for use with such a system and would be very inadequate in traditional systems. The principal reason is that they are purposely engineered to be simple, to be expressive, and to provide only a limited set of grammatical and lexical ways of expressing a statement. They are aimed at taking advantage of person's ability to understand a fragment of natural language written in a limited language and at guiding him to express himself in that limited language. So there is no intent to cover more natural language than a domain requires.

The MAKE-PORTABLE-INTERFACE function described in this patent is NOT the first and only work in the area of generating interfaces of some kind from descriptions of the data, but its purposes are different, its immplementation is simpler, and it works. As mentioned above, its purpose is to be used in conjunction with a menu-based grammar-driven interface driver and to interface to a relational database and to be easy enough to use so that a user who can build tables for his own applications can also easily build and maintain language interface to those tables. Its implementation is simpler than previous works since it does not involve a large grammar that attempts to cover English. It works—several automatically generated interfaces have been successfully tried.

In this section, I will be describing other's work in building transportable natural language interfaces to databases. That work is often not described precisely enough for another researcher to know exactly what techniques were used or how successful those techniques were. It is not surprising that techniques reported in the literature bear some general similarities to my work: an acquisition dialogue of some sort must provide the interface building mechanism with parameters of some kind. Some sort of method is needed to construct the grammar. Some sort of database query language must be the target. A big difference between the present invention and what others have done is that the MAKE-PORTABLE-INTERFACE function generates small grammars which are designed for use with a grammar-driven, menu-based system. All the other systems use large grammars, with all the attendant problems mentioned above. Using the present invention, people who have never seen a lisp machine before can formulate interesting queries using automatically generated natural language interfaces, as often happens in our demos. None of the other researchers have reported that their automatically generated natural language unterfaces are usable (with the exception of Larry Harris and he has not carefully documented his claims in the literature).

As early as 1978, a panel at the SIGMOD database conference in Austin listed five questions concerning natural language interfaces to databases. Even at that time, the question of portability was raised with the question "How much can we automate the process of changing database environments?" (SIGMOD, 1978).

Work at SRI: SRI has been an important center for research into natural language interfaces to databases for several years. Some work has concerned portable interfaces:

Two papers by Kurt Konolige (Konolige 1979) and (Konolige, 1980) are related to this work. The 1979 paper (a tech report) describes a framework for a portable natural language interface to a database. ((I don't have it)). The 1980 paper briefly describes a method of applying metal rules to context-free rules to generate other context-free rules. Konolige is interested in showing how passive and dative movement and other transformations in transformational grammar can be precompiled into a grammar, but roughly the same sort of rule instantiation is used as I have used (he uses symbol replacement and tests on whether to generate new rules and I use string replacement and specify explicitly when to build new rules). The method is not described with respect to a grammar for databases and there is no mention of semantic grammars. Konolige independently notices that his metarule system, because it was applied uniformly, "exposed gaps in a phase-structure grammar that was painstakingly developed over a five year period and was thought to be reasonably complete for a large subset of English."

In (Hendrix and Lewis, 1981), the authors describe TED, a prototype system for creating new domains for natural language systems without the need for specially trained experts. Hendrix described a dialogue in which information (like some of that found in the portable spec) is elicited from a user. That information is stored in tables and a "pragmatic grammar" is used to access the tables at execution time. The pragmatic grammar differs from a semantic grammar in that it contains slots (variable or procedures) that the information in the data structure fills. Hendrix does not describe exactly how the constraints work to guarantee that different slots in the same sentence are semantically related, but assuming that they are, he is describing something with the same descriptive power as a semantic grammar, but with the additional advantage that the pragmatic grammar stays small. His stated intent is to use Jane Robinson's large grammar DIAGRAM (Robinson, 1982) for his pragmatic grammar. The information he gathers involves lexical information gathering (synonyms, antonyms, verb conjugations, +-human, and also database structural information (like what attributes are numeric ...). Hendrix's approach offers a competing way to do the same sort of thing my approach does, but it differs in the ways noted above.

In (Grosz et al, 1982a) and (Grosz, 1982b), Grosz reports on a software component called TEAM. TEAM is an extension to Hendrix's TED. It is implemented using Robinson's DIAGRAM grammar and the acquisition dialogue has been extended to include domain-specific verbs. It is intended for use by a database expert who is not necessarily a natural language expert. In her section on future research in (Grosz, 1982b), Grosz states:

"The existing version of TEAM demonstrates the feasibility of constructing transportable systems. It has been used (in experimental settings) by people who are not experts in natural language processing to create natural language interfaces to databases. Current work on TEAM is concerned with extending the range of linguistic expressions it can handle (e.g., to include temporal expressions, a larger range of verbs, and quantified commands) and the kinds of databases for which it can provide interfaces (e.g. non-normalized databases and those with fields containing dates)."

Grosz offers no documentation to support a claim that usable, portable natural language interfaces result from TEAM. She does not describe the users or the databases they have built interfaces to or the usability of those interfaces.

Larris Harris is responsible for the first important commercial venture that is based on AI technology. He developed the ROBOT system, now called INTELLECT and marketed on ON-LINE ENGLISH by Cullinaine. A database administrator is needed to create and build a lexicon for a fixed grammar and the system interfaces to a single file. Much of what goes into the lexicon is synonym information or operational word definitions (e.g. define "woman" as "employee whose sex="F") and the grammar is large and complex. It is not clear how much effort is required to move to a new domain, but the ROBOT system has been tested in a variety of applications, which is saying more than can be said for the other efforts discussed in this section, which report on transportable systems but give no concrete evidence of a range of applications tested.

The IBM Rendezvous system. The Rendezvous prototype natural language interface to a database uses much the same kind of information as the SRI and TI systems. The information about database structure is stored in data structures that describe both database structural information and linguistic information. The grammar used is some variant of an augmented transition network and contains rules that are domain dependent, with no reported provision for automatically generating interfaces to new domains.

S Jerrold Kaplan (Kaplan, 1979) describes a portable interface which includes an augmented transition network. He restricts his grammar to handle only questions beginning with WH-words, like "who", "what", . . . which limits the syntax his grammar has to recognize, but he offers the user no path to learning to use the limited language that results. His system interfaces to heirarchically structured collections of files. In his system, all domain-specific information is stored in the lexicon. He describes an experience of porting his natural language interface to a new domain database in 5 hours, which is quite good by the standards of the other systems mentioned above, but the process still involves an expert. In his 1979? paper, he does not go into detail on exactly what is involved.

None of the previous work in the field claims the advantages of portability that the present system offers:

an end user can construct his own natural language using an interactive system.

he can finetune the interface by specidying which tables will be covered, the access rights to those tables, the attributes to be covered and the joins that the natural language system will support. He can change menu item phrasing to more natural phrasings.

the interface will be error free.

the interface can be treated as a database object and granted to other users who can then use the natural language to access their data.

Thus, it is object of the present invention to provide a method for rapidly instructing a natural-language menu interface system which is customized according to a particular users needs.

Thus, it is a further object of the present invention to provide a method and system for rapidly constructing a natural language menu interface system which is customized according to the attributes of a particular user-supplied database.

According to the present invention, there is provided:

A system for generating a user customized natural language menu interface from a database supplied by the user and from inputs supplied interactively by a user, comprising:

display means for showing to a user expert a menu of options;

input means, for moving a cursor's apparent position on said display means by the action of said user;

means for receiving a database;

means for displaying on said display means a generalized relation between two or more tables in said database, with generalized indications of corresponding natural-language connecting phrases; and means for interactively receiving from said user a plurality of said relations between tables in said database, together with natural-language connecting phrases corresponding to said relations between tables and said database; and means for integrating said relations interactively selected by said user into a portable specification for natural-language-menu interface, and forstoring said portable specification.

BRIEF DESCRIPTION OF THE DRAWINGS

The present invention will be discussed with reference to the accompanying drawings, wherein:

FIGS. 1-11 demonstrate construction of a natural-language interface to a relational database, as performed by an unskilled user.

DESCRIPTION OF THE PREFERRED EMBODIMENTS

The invention provides a means of generating a semantic grammar and a semantic lexicon from a condensed collection of parameters.

The basic operation of the natural language menu interface system will first be described, and then the features of the present invention, which permit very rapid construction of a user-customized implementation of such a natural language interface system, will then be described. In essence, a natural language menu input system permits the user to provide input in a natural language subset, which has a predefined correspondence to some particular desired set of constrained outputs (e.g. executable machine commands). Partial inputs from the user are successfully parsed, and the parser indicates all possible legal next entries which could follow the input received so far from the user. The set of legal next words is then displayed to the user as active portions of the menu, so that the user need only select one of the legal next words from the menu. Thus, a 0% error rate is guranteed, and training time is greatly decreased, since the user is guided to correct inputs and to correct inputs only.

The present invention provides three major innovations which make such a natural language menu system more useful to users. First, a "build-interface" function is used, which creates a portable specification, i.e. a compact statement of the parameters which are sufficient to define the desired natural language interface to a relational database, according to the inputs received from a particular user expert. It should be noted that the user expert must be familiar with types of queries which are likely to be demanded from the database, but the user expert need not be a computer expert, and need not know any programming language nor need he be familiar with grammars or lexicons. Second, the "make-portable-interface" function derives a grammar and lexicon from a portable specification, such that the grammar and lexicon are then sufficient to implement a natural language menu system. Thus, using the make-portable-interface function, a large number of portable specifications can be stored, and each portable specification can be rapidly constructed into the required grammar and lexicon when that particular natural language interface is called upon. Thus, a large number of natural menu interfaces can be kept accessable, without requiring large amounts of storage for the grammar and lexicon of each interface, which can be somewhat bulky. Third, the present invention also provides a well-formedness test, which tests a grammar-lexicon pair to ensure that they are well-formed. This automatic debugging for an automatically generated natural-language expert system is novel and provides major advantages.

The present invention will be described with primary reference to the presently preferred embodiment, wherein data base queries and updates are addressed to a relational data base. The natural language inputs are parsed using a parser which is generally similar to that disclosed in the 1981 dissertation of Ken Ross entitled "Parsing English Phrase Structure". The system is coded in LISP, and has been demonstrated on a LISP machine from LMI Incorporated. However, as will be obvious to those skilled in the art, the present invention can alternatively be realized using a wide variety of other physical systems, and the key ideas of the invention can also be translated into other programming languages than LISP. For example, a further embodiment of the present invention, which is presently under development, realizes the present invention on a Texas Instruments Professional Computer, instructed by source code which is written in "C". It should also be noted that the particular parser used in the preferred embodiment is not necessary to the invention, but other parsers can be used. Numerous parsers have been disclosed in the prior art. However, the presently-preferred embodiment uses a parser which will be described in great detail.

As discussed above, the end result which the present invention seeks to achieve is to permit the user to input well-understood sentences in a convenient language, which is preferably a subset of a natural language (such as English). According to this invention, after the user has input each successive word of a sentence, the set of all possible next words which could form the continuation of a grammatical sentence is displayed to the user, so that he needs only to select one of the possible next words. (More broadly, some of the possible inmuts can be lumped together as a category, so that one of the displayed items would be, e.g., "(specific number)", as will be discussed below.)

In general, this is accomplished by parsing partial inputs received from the user as they are received, so that the parser generates the set of possible functional descriptions which could be the next element in a legal input, and displays a set of words (corresponding to these functional descriptions of possible next elements). Thus, the end result of the operation, after the user has input a complete sentence, is a parsed command which is in accordance with the predefined grammar, and therefore can be trivially translated into an executable instruction, as will be discussed below.

The first step in the implementation of this method which will be described in detail is the operation of the parser itself. A simplified version of the parser will first be described, and then the modifications which permit word-at-a-time parsing and prediction will be described. The preferred parser can be specified in terms of nonstandard turing machine instructions, as described by Griffiths and Petrick, which operate on the upper elements of an alpha stack and a beta stack in accordance with the current state of the upper elements of the two stacks. The topmost elements of these stacks are represented as an ordered pair such as (XY, ZW), where X is a string variable corresponding to the upper elements of the alpha stack, Y is the next element of the alpha stack after X, Z represents the upper elements of the beta stack, and W is the next element of the beta stack. The parser rules can then be stated as:

1. If one of the rules of the grammar which can be applied is of the form $A \rightarrow V_1 V_2 \ldots V_n$, then we map a condition $(V_1 \, Y, X)$ onto $(Y, V_2 \ldots V_n \, t \, A \, X)$, and we attach $V_1$ as a node beneath A. However, this rule is applicable only if X is in the set of "non terminals", that is if X itself represents a partial parsing tree rather than a first-level input, such a word or the immediate classification of a word (e.g. noun, adjective, determiner, etc.). The symbol "t" is merely a placeholding symbol, which is used in this formalism to permit proper application of the succeeding parser rules. Thus, this first partial rule stores the possibility that $V_1$ is the beginning of a group which can be parsed under a higher level node A (e.g., the possibility that, if $V_1$ is a determiner, it is the beginning of a noun phrase such "the parts"). Where an element is associated beneath another element, this provides one step in building up the tree of associated nodes which will eventually form a complete parse. Thus, a sample of a completed parse, in a grammar roughly corresponding to English, might be as follows:

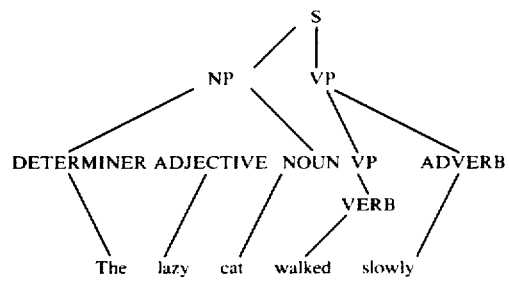

The first association is always a direct translation from a specific word (e.g. "cat") to its directly associated category ("noun"). However, it should be preliminarily noted here that the categories used need not be as broad as familiar English-language parts of speech, but, at least for database-query applications, are preferably modified to include some semantic information. Thus, in the presently preferred embodiment, categories such as "number-noun phrase", "worker-noun phrase", "operation-noun phrase", "job card-noun phrase", and others are used. (Such grammars are known in the art as "semantic grammars".)

Intuitively, parser Rule 1 means that, where a rule of grammar might be applicable to a topmost element on stack alpha ($V_1$), that element is removed from the top of stack alpha, and stack beta is pushed down, successively, with the hypothetical parent node of $V_1$ (together with $V_1$ associated below it), with a place holding symbol "t", and with the remaining symbols which would be required by the possibly-applicable rule of grammar ($V_2 \ldots V_n$). For convenience, we restate parser rule 1 again:

Rule 1: If one of the available rules of grammar applied can be stated as $A \rightarrow V_1 V_2 \ldots V_n$; and if a non terminal X is on top of stack beta; then $(V_1 \, Y, X)$ maps onto $$(Y, V_2 \ldots V_n \, t \, A \, X).$$
$$\phantom{(Y, V_2 \ldots V_n \, t \, A \,} | $$
$$\phantom{(Y, V_2 \ldots V_n \, t \, A \,} V_1$$

2. The second rule of the parser shows how the place holding symbol t is used to indicate that a perfected partial parse can be transferred from stack beta to stack alpha:

Rule 2: If the place holding symbol t is on top of the stack beta, and is immediately followed by a nonterminal symbol A, the place holding symbol t is deleted and the nonterminal symbol A is transferred from the top of stack beta over to stack alpha:

(X t A Y) maps onto (A X, Y).
    |                |
    n              n

Intuitively, the allocation of functions between stacks alpha and beta is that stack alpha contains only parse trees or well-formed subparts of parse trees, whereas stack beta is used to hold partially formed subpart of parse trees.

3. The third rule is used to determine when a necessary portion of the elements required to complete a parse have been found. The formal statement is:

Rule 3:

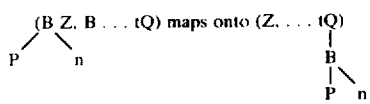

The operation of the parser is initiated by loading the string of words to be parsed into stack alpha, followed by a numeral sign, and by loading the higher level symbol corresponding to the root node of the tree to be constructed, followed by a numeral sign, on stack beta. That is, where (as is usual) the parser is serving to organize strings of words into properly parsed sentences, the symbol which indicates a complete sentence in the grammar (in rules such as S→NP VP) is loaded onto stack beta. Thus, the initial condition of the procedure can be represented as $(W_1 W_2 \ldots W_n\#, S\#)$.

A successful parse has been found when the final condition of the two stacks is (S#, S#). In this case, the nodes below the S on the alpha stack provide the desired complete parse. If the root node (i.e. the object of the parsing) is not a sentence parse, but, for example, a noun phrase parse, then the condition indicating a successful parse would be correspondingly different, e.g. (NP#, NP#).

When no rule is applicable, the instant parsing path represents a bad parse, and the parser must retrace and follow a different parsing path.

When more than one parser rule can be applied, and/or when more than one rule of the grammar can be applied through parser rule 1, alternative parsing paths must be followed. Eventually, all of the alternative parsing paths will result in either successful or unseccessful parses. The set of seccessful parses represents the output of the parser, after completion of the parsing process. This has substantial advantages in the present invention, as described below.

An example of the operation of this simplified version of a parsing procedure will now be given. Suppose, for example, that the grammar to be applied is as follows:

(3.4) Grammar

S→A B

S→A B C

A→A C

A→x

B→C B

B→z

C→y

In this example, the input string is "xyz", which is to be parsed as an "S".

TABLE 1

| Parser Rule | Stack Alpha | Stack Beta | Grammar Rule |
|---|---|---|---|
| | x y z # | S # | |
| Rule (1) | y z # | t A S #<br>  \|<br>  x | A→x |
| Rule (2) | A y z #<br>\|<br>x | S # | |

Rule (1) applicable 3 Ways:
See continuations 1.1, 1.2 and 1.3

| | | | |
|---|---|---|---|
| Cont. 1.1<br>Rule (1) | y z # | B t S S #<br>/<br>A<br>\|<br>x | S→AB |
| Rule (1) | z # | t C B t S S #<br>  \| /<br>  y A<br>    \|<br>    x | C→y |
| Rule (2) | C z #<br>\|<br>y | B t S S #<br>/<br>A<br>\|<br>x | |
| Rule (1) | z # | B t B B t S S #<br> /   /<br>C  A<br>\|  \|<br>y  x | B→CB |
| Rule (1) | # | t B B t B B t S S #<br> \| / /<br> z C  A<br>   \|  \|<br>   y  x | B→z |
| Rule (2) | B #<br>\|<br>z | B t B B t S S #<br>  /   /<br> C  A<br> \|  \|<br> y  x | |
| Rule (3) | # | t B B t S S #<br> / \ /<br>C  B A<br>\|  \| \|<br>y  z x | |
| Rule (2) | B #<br>/ \<br>C  B<br>\|  \|<br>y  z | B t S S #<br>  /<br> A<br> \|<br> x | |
| Rule (3) | # | t S S #<br> / \<br>A   B<br>\|  / \<br>x C  B<br>   \|  \|<br>   y  z | |
| Rule (2) | S #<br>/ \<br>A  B<br>\| / \<br>x C  B<br>  \|  \|<br>  y  z | S # | |

PARSE FOUND
Cont. 1.2

TABLE 1-continued

| Parser Rule | Stack Alpha | Stack Beta | Grammar Rule |
|---|---|---|---|
| Rule (1) | y z # | B C t S S # / A \| x | S → ABC |
| Rule (1) | z # | t C B C t S S # \| / y A \| x | C → y |
| Rule (2) | C z # \| y | B C t S S # / A \| x | |
| Rule (1) | z # | B t B B C t S S # / \ C A \| \| y x | B → CB |
| Rule (1) | # | t B B t B B C t S S # \| / z C A \| \| y x | B → z |
| Rule (2) | B # \| z | B t B B C t S S # / \ C A \| \| y x | |
| Rule (3) | # | t B B C t S S # / \ C B A \| \| \| y z x | |
| Rule (2) | B # / \ C B \| \| y z | B C t S S # / A \| x | |
| Rule (3) | # | C t S S # / \ A B / \ x C B \| \| y z | |

BAD PATH - NO INSTRUCTIONS APPLY
Cont. 1.3  
Rule (1) | y z # | C t A S # / A \| x | A — AC

| Rule (1) | z # | t C C t A S # \| / y A \| x | C → y |
| Rule (2) | C z # \| y | C t A S # / A \| x | |

Rule (1) and Rule (3) both applicable -
See continuations 2.1 and 2.2
Cont. 2.1
Rule (1), $ | z # | B t B C t A S # / \ C A \| \| y x | B → CB |

TABLE 1-continued

| Parser Rule | Stack Alpha | Stack Beta | Grammar Rule |
|---|---|---|---|
| Rule (1) | # | t B B t B C t A S # \| / z C A \| \| y x | B → z |
| Rule (2) | B # \| z | B t B C t A S # / \ C A \| \| y x | |
| Rule (3) | # | t B C t A S # / \ C B A \| \| \| y z x | |
| Rule (2) | B # / \ C B \| \| y z | C t A S # / A \| x | |

BAD PATH - NO INSTRUCTIONS APPLY
Cont. 2.2-
Rule (3) | z # | t A S # / \ A C \| \| x y |

| Rule (2) | A z # / \ A C \| \| x y | S # | |

Rule (1) applicable 3 ways -
See continuations 3.1, 3.2 and 3.3

Cont. 3.1
Rule (1) | z # | B t S S # / A / \ A C \| \| x y | S → AB

| Rule (1) | # | t B B t S S # \| / z A / \ A C \| \| x y | B → z |
| Rule (2) | B # \| z | B t S S # / A / \ A C \| \| x y | |
| Rule (3) | # | t S S # / \ A B / \ A C z \| \| x y | |
| Rule (2) | S # / \ A B / \ \| A C z \| \| x y | S # | |

PARSE FOUND

TABLE 1-continued

| Parser Rule | Stack Alpha | Stack Beta | Grammar Rule |
|---|---|---|---|
| Cont. 3.2 Rule (1) | z # | B C t S S # / A / \ A C \| \| x y | S →ABC |
| Rule (1) | # | t B B C t S S # \| / z A / \ A C \| \| x y | B →z |
| Rule (2) | B # \| z | B C t S S # / A / \ A C \| \| x y | |
| Rule (3) | # | C t S S # / \ A B / \ \| A C z \| \| x y | |
| BAD PATH - NO INSTRUCTIONS APPLY | | | |
| Cont. 3.3 Rule (1) | z # | C t A S # \| A / \ A C \| \| x y | A →AC |
| Rule (1) $ | # | t B C t A S # \| A / \ z A C \| \| x y | B →z |
| Rule (2) | B # \| z | C t A S # \| A / \ A C \| \| x y | |
| BAD PATH - NO INSTRUCTIONS APPLY | | | |
| DONE | | | |

The foregoing carefully-worked-out example shows in detail the operation of a parser based on a context-free grammar. It can easily be seen from this example that the formal manipulation rules as set forth above translate very simply into programmable operations. For example, the final status of stack beta, in the very last step of the preceding worked-out example, could be easily represented in Lisp by a list formatted, e.g., as follows:

(C t (A (A (A x) (C y))) S).

Note that the # is not required in the Lisp implementation, since an empty list is easily tested for.

As noted, the parser set forth above must be modified for use in the present invention. The parser used in the present invention must be able to produce the set of items which can come next, in addition to creating a parse tree. In order to do this, the parser must be able to begin parsing as soon as the first word or phrase is input. It cannot, as the parsers which have generally been employed in prior art natural language understanding systems do, wait until the entire sentence is input before it begins to parse. The parser set forth in the 1982 Ross publication does have the ability to begin parsing immediately upon input of the first word or phrase. Thus, the presently preferred embodiment uses a modification of this parser, as will now be set forth.

For consistency with the published literature, the formalism of the parser will now trivially be altered. A 3-stack informal turing machine formalism will now be used, which differs slightly from the previous format in that the incomplete parse trees which were formerly held below the place holding symbol "t" in stack beta will now be held separately in a gamma stack.

This MSBT (Modified Selective Bottom to Top) parser is formally characterized in terms of turing machine instructions which apply to three stacks, alpha, beta and gamma. These instructions are of the following form, where A, B, C, D, E, and F can be arbitrary strings of symbols from the terminal and nonterminal alphabet.

(A, B, C)→(D, E, F) if "Conditions"

This is to be interpreted as follows:
If A is on top of stack alpha,
B is on top of stack beta,
C is on top of stack gamma,
and "Conditions" are satisfied
then replace A by D, B by E, and C by F.

Given this interpretation of the turing machine instruction, the MSBT parser is instantiated by the following turing machine instructions. To begin parsing a sentence, the input string to be parsed is put on stack alpha, the root symbol of the parse tree to be constructed is put on stack beta and ∅ is put on stack gamma. ("∅" indicates that there are no contents to the stack.)

$$(V1, X, Y) \rightarrow (\emptyset, V2 \ldots Vn\ t\ X, A\ Y) \tag{1}$$

if A→V1 V2 . . . Vn is a rule of the phrase structure grammar, X is in the set of nonterminals, Y is anything, and A can be reached from X. (Whether A "can be reached from X" is shown in the reachability matrix, as will be discussed below. Briefly, the reachability matrix excludes impossible word sequences, such as "the the", among other things.

$$(X, t, A) \rightarrow (A\ X, \emptyset, \emptyset) \tag{2}$$

if A is in the set of nonterminals $$(B, B, Y) \rightarrow (\emptyset, \emptyset, Y) \tag{3}$$

if B is in the set of nonterminals of terminals.

$$(X, (C1\ C2 \ldots Cn), Y) \rightarrow (X, C1\ C2 \ldots Cn, Y) \tag{4}$$

$$(X, (C1\ C2 \ldots Cn), Y) \rightarrow (X, \emptyset, Y) \tag{5}$$

For all i, Ci=(Cj CJ+1 . . . Cp) or {C1 C1+L . . . Cm} or X.

If X is in the set of terminals.

$$(X, \{C1\ X, Y) \rightarrow (X, \{, Y) \tag{6}$$

$$(X, \{C1\ X, Y) \rightarrow (X, C1:, Y) \tag{7}$$

if X not = }

$$(X, :), Y) \rightarrow (X, \emptyset, Y) \quad (8)$$

$$(X, \{C1\}, Y) \rightarrow (X, C1, Y) \quad (9)$$

$$(X, : C1, Y) \rightarrow (X, :, Y) \quad (10)$$

where: is a special symbol which is neither a terminal or a nonterminal symbol.

C1 is a Ci type variable as defined earlier.

(Rules 4 through 10 are added to permit use of grammar rules which contain parentheses and curly brackets. These elements are nationally convenient. Curly brackets indicate that exactly one of the elements within the brackets is to be inserted. Parentheses indicate that one or more (or none) of the elements in parentheses can be inserted. Ci-type variables are added merely to keep track of nested brackets and parentheses although this function is easily accomplished in the Lisp implementation)

If no instructions apply, the root symbol is on top of stack beta, the same root symbol is on top of stack alpha, and stack gamma is empty, then a valid parse has been found. If no instructions apply and the above conditions are not true, then that path has ended without producing a valid parse of the input string. To obtain all valid parses of the input string, all paths must be pursued until they either produce a valid parse or end without producing a parse.

The parser is called selective because it employs a reachability matrix to eliminate bad parse paths before trying them as described in Ross (1981). The reachability matrix indicates whether X can dominate A where A is on a left branch. The reachability conditions are satisfied if X can dominate A in this configuration.

The reachability matrix is a Boolean matrix, which contains a logical value for each pair of nodes (N,M) in the grammar to indicate whether any legal parse tree could have node N as a leftmost daughter of node M. The construction of a full reachability matrix is preferably accomplished as set forth in Warshall and in Baker: See "A Note on Multiplying Boolean Matrices," Communications of the ACM (February 1962) p. 102, and "A Theorem on Boolean Matrices," Journal of the Association for Computing Machinery, Volume 9, Page 11 (1962), which are hereby incorporated by reference, Briefly, the grammar rule are used to construct a matrix for immediate reachabiliyt, that indicates which nodes can be immediate daughter nodes of which other nodes. This matrix is then multiplied by itself repeatedly, until it stabilizes, that is until further multiplication of the final matrix by the immediate reachability matrix produces no further change in the final matrix. This final matrix is itself then the reachability matrix. However, in the presently preferred embodiment, the full reachability matrix is not compiled, but instead a list is compiled, for each node in the grammar, listing the other leftmost daughter nodes which can be dominated by that node.

The rules stated thus far define a recognition procedure. It will determine whether or not a given string can be parsed into a tree dominated by the specified root node. The following addition is required to enable the parser to produce the parse tree(s) for the input string.

When (1) is applied, attach V1 beneath A.

When (3) is applied, attach the B on alpha B as the right daughter of the top symbol on gamma.

The parse tree will now appear on stack alpha, instead of just the root symbol.

The statement of the parser given above is neutral with respect to the control structure that the procedure employs. The preferred embodiments of the present invention use a breadth-first control structure, which carries a parse as far as possible for each word of the input string. Thus, after inputting the nth word, a complete parse up to that word has been performed.

For the parser to proceed in a breadth-first manner, it is only given the first word of the input string. Then, the item !MORE is inserted after that word. If no other instructions apply and !MORE is on top of stack alpha, the current contents of the beta and gamma stacks are saved and the parser backtracks to the last place that parse paths were split. Once all backtracking is completed, the next word is put on the top of stack alpha and one of the saved of each of the saved beta-gamma pairs is put on the beta gamma stacks. Parsing then begins again with one parser state for each beta-gamma pair. This procedure is repeated until there are no more words in the input string.

This function will be described in slightly more detail. To do this, a depth-first control structure must be described first.

A depth-first strategy pushes one state as far as it will go. To do this, apply one of the rules that are applicable, get a new state, and then apply one of the applicable rules to that new state. Continue this until either no rules apply or no parse is found. If no rules apply, it was a bad parse path. If a parse is found, it is one of possibly many parses for the sentence. In either case, continue on and pursue all other alternative paths by backtracking to the last choice point, picking another applicable rule, and continuing in the manner described earlier. By doing this until the parser has backed up through all possible choice points, all parses of the sentence will be found.

To parse breadth first and introduce the ability to begin parsing given only one word of the input and these are put on stack alpha. If not other instructions apply and !MORE is on top of stack alpha, the parser must begin to backtrack as described earlier. Additionally, the contents of stack beta and gamma must be saved. Once all backtracking is completed, the next word, followed by !MORE, is put on alpha and parsing begins again with a set of states, each containing the new input word on alpha an done of the saved tuples containing beta and gamma. This procedure is then iterated until all words have been processed. The ability to parse a word at a time is essential for the NLMenu System. However, it is also beneficial for more traditional natural language interfaces. It can increase the perceived speed of any parser since work can proceed as the user is typing and composing his input. Note that a rubout facility can be added by saving the beta-gamma tuples that result after parsing for each of the words. Such as facility is used by the NLMenu System.

It is straightforward to add a well-formed state table to a Parser modified in the way just described. Before beginning a parse with new input and a set of beta-gamma pairs, the beta-gammas can be compared and those with common subgoals can be merged. This has also been implemented in the parser used for the NLMenu System.

The ability to predict the set of possible nth words of a sentence, given the first n−1 words of the sentence is the final modification necessary to enable this parser to be used for menu-based natural language understanding. Fortunately, this feature can be added in a straightforward way. Given any beta-gamma pair representing one of the parse paths active n−1 words of the sentence have been input, it is possible to determine the set of words that will allow that state to continue. To to this, look at the topmost symbol on stack beta of the tuple. This represents the most immediate goal of that parse state. To determine all the words that can come next, given that goal, the set of all nodes that are reachable from that node as a left daughter must be determined. Fortunately, this information is easily obtainable from the reachability matrix discussed earlier. Once the set of reachability nodes is determined, all that need be done is find the subset of these that can dominate lexical material. Now, if this is done for all of the beta-gamma pairs that resulted after parsing the first n−1 and the union of the sets that result is taken, the resulting set is a list of all of the lexical categories that could come next. The list of next words is easily determined from this, e.g. through the lexicon.

Note that not only does the ability to parse a word (or phrase) at a time enable the parser to be modified so that it can predict what can come next (as will be described below), but the ability to parse a word at a time also reduces parsing time. With traditional parsers where the entire sentence must be input before any parsing is done, no parsing can be done while the user formulates and inputs his query. However, if processing begins as soon as the first word or phrase is input, then the time it takes for a user to input his sentence can be put to productive use. Thus, rather than there being a delay of several seconds or more after the sentence is input, the parse is completed almost instantaneously after input is terminated because most of the work was done before the input was completed.

The most important feature of this procedure is that it can predict the set of possible terminal symbols that could be the nth input item, if it has completed parsing up to the (n−1)th input item. It is this facility that enables the proper menus and proper items in those menus to be displayed so that the next input item can be chosen from a menu. To enable the parser to compute this information, for each potential mother node, the list of all possible daughters that could be left corners must be computed. This can be done either directly by accessing the phrase structure rules or indirectly by first computing the reachability matrix and then looking at all pairs X and Y such that X can dominate Y as a left daughter. The preferred embodiment uses the first method. For each mother node of the rules, a list is compiled of all nodes that mother node can dominate as a left corner. This is done by running through all rules and compiling a list.

This process (highlighted menu, user selection, parse, new highlighted menu) is then continued, until the user indicates that he is finished with the sentence which he wishes to input. At this time, there is necessarily at least one valid parse tree in storage, as discussed above. However, it is possible that there may be more than one valid parse tree. Thus, for example, a sentence such as "find suppliers who ship parts to suppliers who own airports and who are located in Boston) is formally ambiguous, since it is not clear whether the limitation "who are located in Boston" refers to the first set of "suppliers" referred or to the second set of "suppliers". To resolve such ambiguities, a final step in the presently preferred embodiment displays to the user, where more than one valid parse exists at the completion of a sentence input, alternative parsed versions of the input sentence, using indentations to show the relative referents of the dependent clauses. The user then selects between the alternative parses displayed, so that the end product is a single unambiguous parse of an input sentence.

The process by which such an unambiguous parse is translated into an executable machine command (or an output according to some constrained system, for other applications) will now be described.

Associated with every word in the lexicon, there is a translation. This translation is a portion of the meaning of a sentence in which the word appears. In order to properly combine the translations of the words in a sentence together, there is a rule associated with each context-free rule indicating the order in which the translations of the symbols on the right side of the arrow of a context-free rule are to be combined. These rules are parenthesized lists of numbers where the number 1 refers to the first item after the arrow, the number 2 to the second, etc.

For example, for the rule X→A B C D, a possible rule indicating how to combine translations might be (3 (1 2 4)). This rule means that the translation of A is taken as a function and applied to the translation of B as its argument. This resulting new translation is then taken as a function and applied to the translation of 4 as its argument. This resulting translation is then the argument to the translation of 3, which is a function.

In general, the translation of leftmost number applies to the translation of the number to its right as the argument. The result of this then is a function which applies to the translation of the item to its right as the argument. However, parentheses can override this as in the example above.

Translations that are functions are of the form "lambda x . . . x . . . ". When this is applied to an item like "c" as the argument, "c" is plugged in for every occurrence of x after the "lambda x" and the result is just the expression with the "lambda x" stripped off of the front and the substitution made. This amounts to a simplified version of "lambda" conversion as used by all work in Montague Grammar (See Montague 1973).

For example, consider the sentence "John hit Mary". A reasonable meaning might be (hit John Mary) If John is assigned to the lexical category NP and assigned the and assigned the meaning "John", and "Mary" is assigned to the lexical category NP and assigned the meaning "Mary", and if "hit" is assigned to the lexical category V and assigned the meaning "lambda x lambda y (hit y x)", the following rules will yield the desired meaning.

S ⟶ NP VP
(2 1)

VP ⟶ V NP
(1 2)

To see why this is so, note that the meaning of the subtree VP would be the result of applying the meaning of the V to the meaning of the NP because of the rule (1 2). The result of applying "lambda x lambda y (hit y x)" to Mary is "lambda y (hit y Mary)". The meaning of the entire tree is the meaning of the VP, via the function "lambda y (hit y Mary"), applied to the meaning of the NP, John. This function applied to this argument produces "(hit John Mary)".

The forgoing discussion shows how inputs are parsed in accordance with a predefined grammar and lexicon. It should be noted that the present invention is applicable to constraining natural language inputs in accordance with any system which can be formally represented by a comparable grammar and lexicon. That is, the present invention is not applicable solely to data base query systems, but can be used to generate well-formed executable machine commands in any machine language using natural language input. Moreover, the present invention is not applicable only to semantic grammar-defined systems, but can also be used with syntactics-gramma defined systems. Moreover, the present invention is not applicable only to provide executable machine commands as outputs, but can be used to provide formally constrained outputs of any type whatsoever, from a natural language input, as long as a correspondence between the desired set of formally constrained outputs and a natural language subset which has a well-formed grammar can be defined.

The class of grammars currently used by the parser is context-free grammars (or CFG's). Any arbitrary context-free grammar is permitted, with two minor exceptions to be discussed after context-free grammars are defined.

Context-free grammars consist of an alphabet of symbols and a finite set of rules containing these symbols. Symbols are classified as being either terminal symbols or nonterminal symbols. Terminal symbols are those symbols which appear in the lexicon (or dictionary) and thereby classify words according to categories. For example, terminal symbols commonly used in linguistic work are shown to the left of the colon in the example lexicon below.

Determiner: the, a
Adjective: lazy, red
Noun: cat, book
Verb: ate, saw
Adverb: slowly, greedily Nonterminal symbols are those symbols which are not terminal symbols.

Rules are of the form A→B1 ... Bn (where n 0). The Bn's are either terminal or nonterminal symbols. A is a nonterminal symbol. As a simple example, consider the following set of rules:

S→NP VP

NP→Determiner Adjective Noun

VP→VP Adverb

VP→Verb

Given the lexicon shown earlier, the above grammar will determine whether sentences containing words in the lexicon are grammatical or ungrammatical, once a nonterminal symbol is assigned as the designated symbol for the grammar. The designated symbol indicates what a sentence is.

The process of taking a sentence and determining whether it is grammatical, given a grammar, is called parsing. The result of parsing a sentence is one or more parse trees if the input is a valid sentence. If the input is not a sentence, parsing produces no parse trees. For example, if S is assigned to be the designated root symbol, the sentence "The lazy cat ate greedily" is ruled grammatical by the above grammar because the following tree is the result of parsing that sentence with the above grammar.

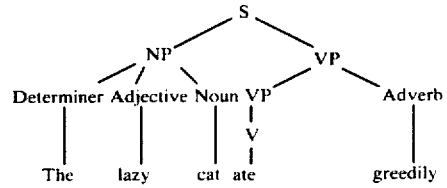

Any arbitrary context-free grammar is permitted as input to the parser except for those grammars containing two classes of rules. These are rules of the form X→null and sets of rules that generate cycles, for example, A→B, B→C, C→D and D→A. The problem with the first class of rules is that they make it very difficult for the predictive version of the aglorithm to determine all and only those words that can come next in a sentence. The problem with the second class of rules is that they result in an infinite number of possible parse trees for a given sentence.

The elimination of the second class of rules causes no difficulty and does not impair a grammar writer in any way. The elimination of the first class of rules causes a small inconvenience in that it prevents grammar writers from using the existence of null nodes in parse trees to account for certain unbounded dependencies like those found in questions like "Who do you think I saw?" which are said in some linguistic theories to contain a null noun phrase after the word "saw". However, alternative grammatical treatments, not requiring a null noun phrase, are also commonly used. Thus, the prohibition of such rules merely requires that these alternative grammatical treatments be used.

A sample grammar and lexicon is provided below, as Appendix C.

Simpler and smaller grammars would result if the class of grammars allowed was extended to allow augmentations to be associated with the context-free rules. The process of automatically generating a grammar for relational database applications would be greatly simplified by this extension in the class of grammars as well. This would result in increased efficiency throughout the system.

Below, such an extension is described. It is essentially a simplified version of the grammars formulated and characterized as Local Grammars in Ross (1981) and Saenz (1982).

Two modifications are necessary. Firstly, lexical items (terminal nodes) will have syntactic features associated with them. This idea is not new (see, for example, Chomsky (1965)). In general, the values of syntactic features have been thought to be binary. So, for example, a singular noun would have a feature named SING with a value of + and a plural noun would have a value of − for the feature SING. Instead, features will be allowed to take on more than two values. This option was first discussed for syntax in Friedman (1973) and her paper provides arguments in favor of this approach within a transformational framework. Features values are constrained to be strings of a finite number of concatenated symbols. Friedman constrained possible feature values even further because of constraints placed on her system by a transformational conponent.

The second modification is a mechanism which will allow feature names and values to be assigned to nonterminal nodes. The idea that nonterminal nodes have features associated with them has been implicit in many syntactic analyses which have been proposed. It has been explicit in some analyses, too. Dougherty (1970, 1971) enriches the mechanism which Chomsky (1965) utilizes to assign features and thereby is able to assign features to some nonterminal nodes. The grammar used by the TQA (Transformational Question Answering) described in Plath (1973) assignes features to non-terminal nodes by transformation.

A very general mechanism which will assign features to nodes of trees, based on other features of the nodes of that tree, was proposed in Knuth (1968). Petrick (1973) adopts this mechanism, using somewhat different notation. The work of these researchers have been built upon in the design of the feature percolation mechanism described here. The mechanism is a constrained version of Knuth's.

Knuth's mechanism enables feature names (attributes in Knuth's terms) and their values to be passed up and down a tree. Associated with each phrase structure rule, there is a set of rules which indicates how to pass the features around. These will be referred to as feature percolation rules. Knuth allows the value of a feature for any of the nodes expressed in a phrase structure rule to be set either to the value of a feature of any of the nodes of that phrase structure rule or to the value of a function applied to the values of features of any of the nodes expressed in that phrase structure rule. Once a feature value is assigned for a particular node, it does not change.

For a structure like the one given below, the features of Nom1 can be determined by either other features of the node itself, the features of the nodes below, it (Nom2 and S), the features of the node above it (NP) or the features of its sister node (det).

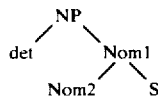

In turn, the features of these nodes could be determined by their mother node, daughter nodes, or sister nodes. This in effect means that information from anywhere in the tree can be transmitted to the nodes which determine the features of Nom1.

Utilizing Petrick's notation to illustrate this, the following feature percolation rules could be associated with the phrase structure rule given below.

NP→det Nom

FEATURE1(0) = F1(FEATURE2(0), FEATURE3(2))

FEATURE3(2) = F2(FEATURE4(1))

FEATURE4(1) = FEATURE4(2)

The numbers 0, 1, and 2 indicate the nodes represented in the phrase structure rule. 0 is the node to the left of the arrow, the NP node. 1 is the node immediately to the right of the arrow, the det node. 2 is the second node to the right of the arrow, the Nom node. In general, N will be the Nth node to the right of the arrow (for N 0).

The first feature rule is interpreted as setting the value of FEATURE1 for the NP node to the result of applying the function F1 to the values of FEATURE2 of the NP node and FEATURE3 of the Nom node.

Local Grammars constrain the value of a feature of a node to only be determined by values of features present on nodes that that node dominates (nodes that dominate others are above those others in a tree).

This means that the feature values of the nodes of any subtree can only depend on the feature values within that subtree. This is accomplished by restricting feature percolation rules so that features will only percolate up the tree, not down. Thus, only percolation rules in which a feature of the 0 node is being determined by a function applied to the values of the features of nodes 1 through N or by the value of a feature of one of nodes 1 through N (where this feature percolation rule is associated with a phrase structure rule with N elements following the arrow) are permitted.

Another class of augmentation rules are used as well. These check the features of nodes and filter out ill-formed structures based on the values of these features. These rules are called feature blocking rules and will be written as conditions on the values of the features of the nodes to the right of the arrow. Petrick's notation will be utilized for these rules as well, but here it should be interpreted somewhat differently. In general, block rules will state that the value of a feature of nodes 1 through N or the value of a function applied to the values of the features of nodes 1 through N must be equal to either the value of a feature of the nodes 1 through N or the value of a function applied to the value of features of nodes 1 through N. These rules are not to be interpreted as assigning feature values. They are, instead, well-formedness conditions which indicate whether a subtree is valid, according to the grammar.

As an example of the feature mechanism in action, consider a hypothetical language with the following properties.

I—Verbs and Subject NP's agree in Number and Person

II—Nouns and their Determiner agree in Number and Gender

III—Adjectives and Nouns agree in Gender

IV—The language is SVO and in Noun Phrases, the order of constituents is Determiner-Adjective-Noun The following phrase structure rules and feature rules characterize the above situation if the values of the feature PERSON range over the numbers 1,2, and 3 (indicating first, second and third person), the values of NUMBER range over SING and PLUR, and the values of GENDER range over MASC and FEM.

S ⟶ NP VP

Blocking
PERSON (1) = PERSON (2)
NUMBER (1) = NUMBER (2)
Percolation
none

VP ⟶ V NP

Blocking
none

-continued

Percolation
PERSON (0) = PERSON (1)
NUMBER (0) = NUMBER (1)

NP ⟶ det Adj N

Blocking
NUMBER (1) = NUMBER (3)
GENDER (1) = GENDER (3)
GENDER (2) = GENDER (3)
Percolation
NUMBER (0) = NUMBER (3)
PERSON (0) = PERSON (3)

An example of a tree which could be produced by these rules follows.

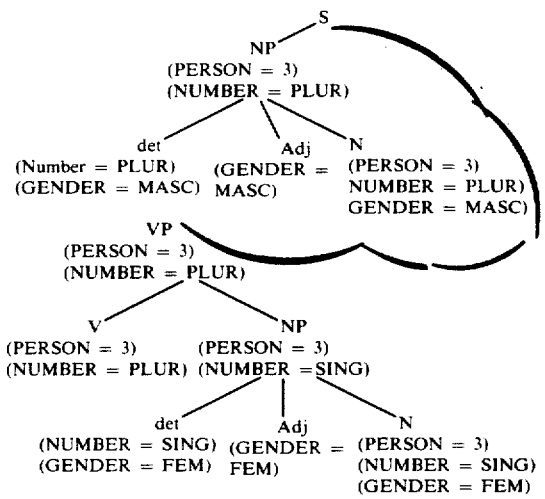

To do predictive parsing with a grammar like the one described above, in addition to calculating the reachability matrix for the context-free portions of the grammar rules, the percolation and blocking rules must be taken into account. There are several possible ways to do this.

One possibility is to construct a much larger reachability matrix which contains feature information. This can be done by having one entry in the reachability matrix for every possible set of attributes and values that can be associated with each of the symbols. Thus, in the example above, rather than just having an entry indicating whether NP can dominate det, one is required for whether NP with PERSON=2, NUMBER=SING and GENDER=FEM can dominate det with PERSON=3, NUMBER=SING and GENDER=FEM, one is required for whether NP with PERSON=2, NUMBER=SING and GENDER=FEM can dominate det with PERSON=2, NUMBER=SING and GENDER=FEM, etc. This information can be calculated from the percolation and blocking rules asociated with the context-free rules that are traversed to determine if det can be reached from NP in the context-free case.

Except for very small grammars, this first solution would require a prohibitive amount of storage for the reachability matrix. A second solution is to do the same the calculation at the point where the reachability information is required rather than prestoring the answer in the reachability matrix. This would take quite a bit of calculation at run time.

A third choice, and the one seen as most promising, is to calculate the reachability matrix for the context-free version of the rules and then to associate an equation or set of equations with each item in the matrix. In the example above, these equations can be calculated from the percolation and blocking rules associated with the context-free rules that are traversed to determine if det can be reached from NP in the context-free rules. When the values of the features of the two nodes for which reachability matrix information is required are known, they are plugged into this equation. The result of this equation will be either true or false indicating reachability.

It is the ability to determine the set of terminals that can come next that differentiates the invention method from others and it is this ability that enables the proper items and menus to be displayed, thus insuring a 0% failure rate for natural language input to the system.

A sacrifice has been made to achieve this 0% failure rate, however. The preferred parser is only able to employ context-free grammars and cannot use the augmented context-free grammars that were discussed earlier. This is because the augmentations need to be taken into account when predicting the items that can come next. The present invention can be applied to augmented grammars as discussed above, but the capability is not included in the presently-preferred embodiment. Thus, the less powerful context-free grammars must be used. For a natural language system that needed to handle all paraphrases (as traditional systems must), context-free grammars are unacceptable. They do not have enough power to characterize a fragment of natural language that is very large. However, for a system that only needs to characterize one way of saying things, context-free grammars are adequate. So, for our system, the sacrifice is not very great. Additionally, a parser that could process input using augmented context-free grammars would necessarily be slower than the parser we employ. Thus, this "sacrifice" actually results in our system being able to parse faster.

The prototype is currently implemented on an LMI Lisp Machine. It employs the algorithm described above and uses the Lisp Machine's software for creating the menus required and manipulating them as described above. The prototype implementation is a natural language database query system which accesses the parts-suppliers database described in Date (1975), p. 79. This database is stored in relational form in a relational database management system that was implemented on the Lisp Machine. The Lisp code (Lisp machine) for the parser and for the construction and manipulation of the menus is included in the Appendices below. The grammar which characterizes the allowed queries to the database is also included.

The items displayed on the menu to the user, and which can be selected by the user, need not be only words or phrases. The user can be offered inputs such as words, phrases, numbers (either unconstrained, or constrained), direct typed input (e.g. to add a new entry to a database), direct graphics input (e.g. by indicating a position on a map) or other versatile possibilities. For example, the items displayed will typically include such entries as "(specific part no)" or "(specific supplier)". When the user mouses one of these, he is then presented, in a little window, with a list of the names of specific suppliers, which is gathered from the database in real time. Thus, these non-word items displayed on the menu add a great deal of versatility and user convenes to this system.

These versatile displayed items are referred to generally as "experts". The implementation of these experts, once their function has been defined, is quite simple. The critical part which should be noted is that, in translation from a partial parse to a list of displayed items, the lexicon must be modified to generate non-word items at this point. Thus, for example, when the partial parse of the instant sentence entry requires that the next word entered be either an adjective or a noun, a pseudo-lexical entry for the appropriate expert item must be addd if the expert item is to be displayed, in addition to entries in the lexicon which might class Jones brothers as a "noun-supplier", an additional entry to class the expert item "(specific supplier)" as a "noun-supplier" must also be added. Note that, once the expert item has been designated by the user, this designation can merely operate as a call to the expert subroutine. In addition, the use of experts does not affect the final translation of the natural language input into machine commands, since each expert concludes its function and retires immediately before the next word is selected. That is, where, e.g., a map is provided to the user, and the user moves the pointer to select a specific latitude and longitude on the map, the entry which will appear in the partial sentence being parsed would be something like "whose latitude is 50° west and whose longitude is 40° north".

In addition, where a very large number of items can be chosen from next, an expert can be used to display subcategories of the possible next items. Experts can also be used to remind the user of limitations in the database. For example, in a parts database, if every part has a weight less than five pounds, an expert for part weight can be used which constrains the numerical part weight input to be less than five pounds.

The experts can also serve as a convenient assist for the user's memory, so that, for example, where the user of a baseball statistics database cannot remember how to spell "Yastrzemski", he can simply call up an alphabetical list of players, or simply a list of players on the appropriate team. Thus, the expert if effect permits sub-queries to the database to be transacted in the midst of formulating a larger query, and thus same much time. In addition, the expert can be used, e.g., to select another input channel. For example, if a peripheral system accessory included electronic output from a scale, an expert item in a parts database could be indicated as "(specific weight read from scale #7)".

As noted, the presently preferred method of user presentation is a CRT screen, on which the various menus are displayed, together with a mouse which moves a curser on the screen. However, as is obvious to those skilled in the art, a wide variety of other actual I/O devices can be used. For example, a flat graphics display (e.g. electroluminescent) could be used instead of a CRT, and user control of the curser could be accomplished, e.g., by a joystick or by voice recognition.

INSERT A

For clarity, the relevant relational database terminology will be set forth now.

RELATIONAL DATABASE: A collection of 0 or more relations. Formally, a relational database is a time varying collection of normalized relations of assorted degrees.

RELATION: A two dimensional named table (or FLAT FILE in older terminology). Each row (called a TUPLE) represents some particular real world entity or relationship (see example) and each column represents some ATTRIBUTE of that type of entity (e.g. AGE of a CONGRESSMAN).

The ordering of the rows and columns in a relation is not usually considered to be significant. The number of rows in a relation is the CARDINALITY of the relation. The number of columns is the DEGREE of the relation. So the votes relation below has cardinality 7 and degree 3. The rows of a relation of degree Ns are called N-TUPLES. So (111-22-3333, #331, no) is a 3-tuple from the votes relation. A relation of degree 2 is often termed a binary relation, degree 3 ternary, . . . .

A DOMAIN is a set of data elements. Domains correspond to DATA TYPES in programming languages. Some databases support only system-defined, syntactic domains like CHARACTER and INTEGER; newer database systems support SEMANTIC DOMAINS (like user defined data types in programming languages). Examples of semantic domains might be:

the set of all Congressmen's names the set of all Congressmen's parties (Republicn, Democrat)

A column of a relation is a subset of a domain, so the congressman.ssn column and the votes.conman column both come from the same domain, the domain of social security numbers. Only data elements from that domain should ever go in those columns.

Many databases require that no two rows of a table be identical. A KEY is some subset of the attributes of the relation and is treated as uniquely identifying the rows (as Bill# in the bill relation). A user can uniquely refer to a row of any table by specifying the table name and the values of the key attributes. So (bill #287) refers to row (#287, tax cut, "In order . . . ") in the bill table. Sometimes a key consists of several attributes as in the votes table where both the conman and the bill# attributes are neede to uniquely idenfiy rows in the table.

Important OPERATIONS on relational databases are:

INSERT a new row into a table

DELETE rows from the table which pass some test build a new table by

SELECTing some rows of interest

PROJECTing one just some columns of interest

JOINing two tables where they agree in some attribute columns (see examples on the attached sheet)

These cut and paste operations are composed together to give a degree of flexibility in retrieval that is not possible in most hierarchical or network structured databases.

The LOGICAL VIEW of a database can consist of a set of two dimensional tables. Physically, these tables might actually be represented in a hierarchy or network structure, since those structures are often more efficient. DATA INDEPENDENCE is the property of a database system whereby the logical view of data stays the same even when the physical view is changed. This is important because it insulates application programs from changes made to the physical way the data is represented.

NORMALIZATION is a design process whereby a complex data structure (often a hierarchy, or tree structure, or a network, or graph structure) is decomposed into relations.

Notes on current terminology:

Flat file: used more to describe the physical structure of a relation, not the logical structure.

Vector: A one-dimensional ordered collection of data items. Not popular terminology, but if it is used it would correspond to an N-tuple or row.

Tag: Not current terminology.

This section describes a manually built nlmenu interface in which a user is guided to build and maintain other nlmenu interfaces. The functionality is defined by the following commands.

TUTORIAL
LIST INTERFACES
CREATE INTERFACE new-interface-expert USING spec-initial
MODIFY INTERFACE existing-owned-interface-with-specs-expert BY CHANGING speclist GIVING new-interface-expert
DROP INTERFACES existing-dropable-interfaces-expert
RENAME INTERFACE existing-owned-interface-expert TO BE new-interface-expert
COMBINE INTERFACES existing-interfaces-with-specs-expert GIVING new-interface-expert
SHOW SPECS exisging-interfaces-with-specs-expert
GRANT INTERFACES existing-owned-interfaces-expert TO users-expert
REVOKE INTERFACE existing-granted-interface-expert FROM granted-users-expert
COMMIT where
spec-initial—COVERED-TABLES (speclist)
speclist—spec (speclist)
spec—COVERED-TABLES
spec—ACCESS-RIGHTS
spec—CLASSIFY-ATTRIBUTES
spec—IDENTIFYING-ATTRIBUTES
spec—TABLE-JOINS.

The meaning of these commands is as follows. The quoted text that follows is the TUTORIAL text taken from the BUILD INTERFACEs interface.

TUTORIAL ON CREATING, MODIFYING, SHARING, AND DROPPING NLMENU INTERFACES

Using BUILD INTERFACES, a user can do the following operations:

TUTORIAL—see this tutorial
LIST INTERFACES—see the interfaces the user owns or has been granted
SHOW PORTABLE SPEC—see a portable spec, the data structure from which a NL interface is generated (see below)
CREATE INTERFACE—create a new interface (a new portable spec)
MODIFY INTERFACE—modify an existing interface by changing the spec
RENAME INTERFACE—rename an existing interface the user owns
COMBINE INTERFACE—combine interfaces
DROP INTERFACE(S)—drop interfaces the user owns or has been granted
GRANT INTERFACE(S)—grant interfaces to other users
REVOKE INTERFACE—revoke a granted interface
COMMIT—commit changes made during a BUILD INTERFACES session Specific HELP is available on each of these operations using ((the HELP key)).

Using the BUILD INTERFACES CREATE or MODIFY commands, a user can specify all the parameters he needs to create a new natural language interface. The parameters are slots in a data structure called a PORTABLE SPEC.

A PORTABLE SPEC contains all the information necessary to specify a complete user interface. A PORTABLE SPEC consists of a set of categories: COVERED TABLES, RETRIEVAL TABLES, INSERTION TABLES, DELTION TABLES, MODIFICATION TABLES, NON-NUMERIC ATTRIBUTES, NUMERIC ATTRIBUTES, COMPUTABLE ATTRIBUTES, IDENTIFYING ATTRIBUTES, TWO TABLE JOINS and THREE TABLE JOINS, USER-DEFINED TABLE EXPERTS, USER-DEFINED TABLE ATTRIBUTE EXPERTS, and EDITED ITEMS. Specific HELP is available on many of these categories using ((the HELP key)). The categories are as follows:

TABLES—the set of relations or views that the interface covers
RETRIEVAL TABLES—
INSERTIONS TABLES—these four specifications list the access
DELETION TABLES—rights that are reflected in the interface
MODIFICATION TABLES—
NON-NUMERIC ATTRIBUTES—for each relation, the attributes to be included in the interface that come from non-numeric domains. Not all such attributes of a relation need be in this list (if the user wants to hide some attributes, say)
NUMERIC ATTRIBUTES—for each relation, the attributes to be included in the interface that come from numeric domains
COMPUTABLE ATTRIBUTES—for each relation, the attributes to be included in the interface that come from numeric domains and that are avergeable, totalable, . . .
IDENTIFYING ATTRIBUTES—for each relation, the attributes that can be used by the user to identify the rows. Usually, this will include the key attributes but it may also include non-key attributes.
TWO TABLE JOINS—a specification of supported joins involving two table THREE
TABLE JOINS—a specification of "relationships" where one table relates two others
USER-DEFINED TABLE EXPERTS—user supplied experts that replace the default experts that the core lexicon provides. These define what interfaction takes place when a user chooses (specific tablename-attributename from the EXPERTS menu
EDITED-ITEMS—the owner of an interface may edit the phrasing of menu items. The system keeps track of the original and new phrasing.

To get the feel of a PORTABLE SPEC, use the BUILD INTERFACES SHOW SPEC command.

Formally, a PORTABLE SPEC is described as follows:

| (Here . . . means /"0 or more repetitions/" of the preceding identifier of list) | |
|---|---|
| TABLES: | (relation . . . ) |
| RETRIEVAL TABLES: | (table . . . ) |
| INSERTION TABLES: | (table . . . ) |

-continued (Here . . . means /"0 or more repetitions/" of the preceding identifier of list)

| | |
|---|---|
| DELETION TABLES: | (table . . . ) |
| MODIFICATION TABLES: | (table . . . ) |
| NON-NUMERIC ATTRIBUTES: | ((table attribute . . . ) . . . ) |
| NUMERIC ATTRIBUTES: | ((table attribute . . . ) . . . ) |
| COMPUTABLE ATTRIBUTES: | ((table attribute . . . ) . . . ) |
| IDENTIFYING ATTRIBUTES: | ((table attribute . . . ) . . . ) |
| TWO TABLE JOINS: | ((use "active phrase" and "passive phrase" to join (table1 attribute . . . ) and (table2 attribute . . . )) . . . ) |
| THREE TABLE JOINS: | ((use "active phrase" and "passive phrase" to join (table1 attribute . . . ) and (table2 attribute . . . )) and to join (table2 attribute . . . ) and (table3 attribute . . . )) . . . ) |
| USER-DEFINED TABLE EXPERTS ((table expert) . . . ) | |
| USER-DEFINED TABLE ATTRIBUTE EXPERTS ((table attribute expert) . . . ) | |
| EDITED-ITEMS | ((menu old-item new-item)" |

In the appendix are included the BUILD-INTERFACE nlmenu grammar, lexicon, window descriptions, and expert definitions that precisely define the current prototype BUILD interfaces interface. The lexical entries contain help text that describes the meaning of the commands and categories like TABLE JOINS, etc. Some of the experts are quite elaborate.

What is significant about this interface is:

it provides an interactive means of eliciting the information needed to create a portable spec from a user. Menus are tailored to the particular user and only show him tables he owns, attributes associated with those tables, etc, so he cannot err. (Here though, the grammar is not a semantic grammar. Instead all of the constraints are in the experts.)

it provides a way to modify an interface (to correct errors or add new tables)

it provides a way for a user who owns an interface to edit the menu items by pointing to them in "edit item mode" and type in replacements it provides a means of combining interfaces by combining their specs it guarantees that the user can only construct interfaces with tables he owns or has been granted access to it provides a means for sharing interfaces between users using GRANT or REVOKE.

Both the MODE OF OPERATION of this interface (highly interactive, window and menu oriented, nlmenu compatible so that it uses the same nlmenu driver as do the nlmenu natural langauge interfaces) AND the FUNCTIONALITY of this interface are NOVEL. SRI International's TED system provides a specification dialogue whereby the system illicits information from the user to build a new natural language interface, but it is much different in character than the one described here.

The foregoing has described the "build-interface" function. The "make-portable-spec" function will now be discussed.

The invention described herein is a component of a grammar-drive, menu-based system. It is referred to as "the MAKE-PORTABLE-INTERFACE function". The function takes a data structure of parameters called a PORTABLE SPEC as its argument and returns a semantic grammar and a corresponding semantic lexicon. An NLMENU-driven system need not include this component. The component adds the functionality to a grammar-driven, menu-based system that makes it easy for a user to build his own natural language interfaces to databases. Without the component, only expert users with grammar-writing expertise can build and maintain such interfaces and only manually, limiting the scope of applicability of an NLMENU-driven system. This invention is dependent on a grammar-driven, menu-based system, but not vica-versa. The specific prototype described in dependent on the NLMENU system described in the companion patent.

The principles behind the invention are: a domain-independent core natural language grammar and a corresponding core lexicon have been designed for use with an nlmenu driver. Domain-specific parameters are substituted into the core grammar and core lexicon and a semantic grammar and semantic lexicon result. This grammar and lexicon pair define a particular domain-specific natural language interface, suitable for use in a grammar-dirven, menu-based system.

The prototype uses a particular core grammar and lexicon. The grammar assumes that the natural language is English, but it could have been another natural language. The target system in the prototype is CSL's lisp machine relational database query language and the semantic translations stored in the core lexicon assume this particular query language, but translations could easily be changed to some relational or even non-relational database query language. (In fact, we now also have translations to SQL for our core grammar/lexicon.) The prototype assumes a fixed set of parameters for substitution, though even now extensions are being made to the parameter list. The core grammar and the lexicon will like-wise be extended to take this new semantic information into account and also to extend the interface to cover more the target database query language.

The remainder of this section describes in detail how a portable specification data structure (already computed at this point) is used to generate a semantic grammar and lexicon from a core grammar and lexicon. First, the function MAKE-PORTABLE-INTERFACE is described. Then we describe portable spec's. Then we describe function MAKE-SEMANTIC-GRAMMAR. Finally, we describe the function MAKE-SEMANTIC-LEXICON.

It is important to note initially that there is no assumption about who specifies the parameters to the function. The information specified to the function might be obtained from a user in an interactive session—or—it might be supplied by the system itself, if the database system's data dictionary of meta information about data is rich enough—or—it might be done through some combination of the above THE FUNCTION MAKE-PORTABLE-INTERFACE This section describes a function MAKE-PORTABLE-INTERFACE which takes as input a *portable-spec* (as defined below) and returns 2 objects: a semantic grammar and a semantic lexicon. Formally,

```
MAKE-PORTABLE-INTERFACE
(*portable-spec*)→(semantic-grammar,
semantic-lexicon)
```

In pseudo code, the entire function is described as follows:

```
function MAKE-PORTABLE-INTERFACE (*portable-spec*);
return (make-semantic-grammar (*portable-spec*),
make-semantic-lexicon (*portable-spec*))
end MAKE-PORTABLE-INTERFACE;
```

In the core grammar being prototyped, the start symbol (root) of the grammar is S, but in general, there might be several entry points to a grammar (as when one wishes to activate only the retrieval but not the insertion portions of a large grammar that covers both the retrieval and insertion operators in a target database language).

PORTABLE SPEC'S

A *portable-spec* contains all the information necessary to specify a complete user interface grammar and lexicon. How that information is elicited does not concern this section. To get the feel of a *portable-spec*, a sample follows, describing a supplier-parts database containing these 3 relations: The sample spec and core grammars to lexicon described in this section are those in use on 11/23/82. The BUILD interfaces section of the patent describes extensions to the spec which are documented in the attached program code.

SUPPLIER (supplier# name city status)
PART (part# name city color weight)
SHIPMENT (supplier# part# quantity)

The sample *portable-spec* for this supplier-parts database might be:

```
((supplier part shipment)
((part city color name part#)
(supplier city name supplier#)
(shipment part# supplier#))
((part weight) (shipment quantity) (supplier status))
((part weight) (shipment quantity))
((supplier supplier#) (part part#) (shipment (supplier #
Part#)))
(color city weight name part# status suppier# quantity
shipment#)
((shipment (supplier# ("who supply". "which are supplied
by") part#) (supplier supplier#) (part part#)))
(((shipment supplier#)
("which were shipped by". "whicha were shipments of")
(supplier supplier#)))
((other specificaitons to be added later))
))
```

Formally, a portable-spec is described as follows:

(Here * is the Kleene Star symbol denoting "0 or more repetitions" of the preceding identifier or list and : means "or")

| | |
|---|---|
| *portable-spec* — | (relations |
| | non-numeric-attributes |
| | numeric-attributes |
| | computable-attributes |
| | identifying-attributes |
| | attributes |
| | 3-way-joins |
| | 2-way-joins |
| | ((others to be added later CSL))) |
| relations — | (rel*) |
| non-numeric-attributes — | ((rel attr*)*) numeric-attributes |
| numeric-attributes — | ((rel attr*)*) |
| computable-attributes — | ((rel attr*)*) |
| identifying-attributes — | ((relattr-or-list)*) |
| attributes — | (attr*) |
| 3-way-joins — | (rel2 (attr-or-list2-1 |
| | ("active-menu-phrase" |
| | "passive-menu-phrase") |
| | attr-or-list2-3) |

(Here * is the Kleene Star symbol denoting "0 or more repetitions" of the preceding identifier or list and : means "or")

| | |
|---|---|
| | (rel1 attr-or-list1-2) |
| | (rel3 attr-or-lsit3-2)) |
| 2-way-joins — | ((rel1 attr-or-list1) |
| | ("active-menu-phrase" |
| | "passive-menu-phrase") |
| | (rel2 attr-or-list2) |
| ((others to be specified later)) | |
| attr-or-list — | attr: (attr*) |

So a *portable-spec* consists of a list of categories. The categories are as follows:

relations—the set of relations (including views) covered
non-numeric-attibutes—for each relation, the attributes to be included in the iterface that come from non-numeric domains. Not all the attributes of relation need be in this list.
numeric-attributes—for each relation, the attributes to be included in the interface that come numeric domain and that are avergeable, totalable, . . .
identifying-attributes—for each relation, the attributes that can be used by the user to identify the rows. Typically, identifying-attributes will include the key attributes, but may include other attributes if they better identify tuples (rows) or may even not include a full key if one seeks to identify sets of rows together.
attributes—the set of attributes from all the relations
3-way-joins—a specification of "relationships" where one
2-way-joins—specification of supported joins The portable spec categories are not unrelated. The following integrity constraints hold:

the relations list can be deduced from the non-numeric and numeric attributes lists
the computable-attributes must be a subset of the numeric-attributes
the attributes list can be deduced from the non-numeric and numeric attribtes lists
the attributes mentioned associated with a relation should really be associated with that relation in the described database The following routines do not verify that these integrity constraints hold though they could easily be modified to do so. Instead, it is assumed that the component that provies the parameters has done this integrity checking.

FUNCTION MAKE-SEMANTIC GRAMMAR

Formally,
MAKE-SEMANTIC-GRAMMER(*portable-spec*-)—semantic grammar.

It is important to note that while a semantic grammer is produced, this description does not really suggest a specific data structure for the grammar. Possibilities include a list of grammar rules and translations, a pointer to a file where the semantic grammar that was produced now resides in some format, or a database relation GRAMMARS with components: (OWNER, INTERFACE-NAME, RULE, TRANSLATION). The grammar may not be in a human readable form, as when it compiled into some set of internal data structures (as is done in one specific way by the LOAD-CFG function in the prototype NLMENU system).

GRAMMAR RULES have two parts: a context-free rule part and an interpretation part telling how to combine translations associated with the elements on the right hand side of the grammar rule to make a translation to associate with the element on the left hand side of the grammar rule. The exact form of a grammar rule is prototype-specific.

The basic operation of the MAKE-SEMANTIC-GRAMMAR function is identifier substitution. Generally this occurs in a context of looping through one of the categories, say non-numeric-attributes, and substituting, for every rel and attr pair, an argument list into one or more forms. For example, in

```
(loop for (rel . attrs) in non-numeric-attributes
    append (loop-for attr in attrs if t
    substitute (rel rel attr rel attr) in ("A-mod -
        whose A- A-is A- A-expert" ((1 2)))))
if non-numeric-attributes = ((part city color name
                                           part#)
                             (supplier city name
                                           supplier#)
                             (shipment part#
                                           supplier#))
the outer loop binds rel and attrs successively to
    part (city color name part#)
    supplier (city name supplier#)
    shipment (part# supplier#)
and on the first iteration, the inner loop successively binds attr to
    city
    color
    name
    part#.
```

In the inner loop, for every rel attr pair, the substitution is done. The substitution takes the form ("~A-mod—whose-~A-~A-is~A-~A-expert" ((1 2))) which contains 5 slots denoted by A and replaces those slots with the values of the substitution list (rel rel attr rel attr). So for instance, when rel=part and attr=city, the following instantiated grammar rule results from the substitution: ("part-mod—whose-part-city-is part-city-expert" ((1 2)))). In the example above, 9 such rules will result from the pair of loops. The other patent describes the meaning of the translations.

It should be noted that although in the version of MAKE-SEMANTIC-GRAMMAR that follows, an outer APPEND is used to create a list of grammar rules, as mentioned above, one could add an insert operation to each inner loop to insert a freshly instantiated grammar rule into the database or a write operation to write the rule to file, and then there would be no need for the extra list structure.

What follows is a pseudo-coded version of the actual lisp implementation which describes how the MAKE-SEMANTIC-GRAMMAR routine works. This code is appropriate since it records the current core grammar (as of 11-23-82) in use in the prototype at CSL.*

*(As we go to patent, a new core grammar has been developed with more operators like SUM, MIN, MAX, . . . and with portable spec categories for insertion, deletion, modification of retrieval rights on relations).

TABLE 1

;the expansion macro which instantiates grammar rule templates
;for completeness only <<LISP MACHINE SPECIFIC>>
(defmacro loop-for (a in b if e substitute c in d)

TABLE 2

```
if ,e
collect (cons (format nil rule-string ,ec)
interpretations))))
;makes a semantic grammar from a set of rule templates
function MAKE-SEMANTIC-GRAMMAR (spec):
;unpack the portable spec list into the named catagories (local variables)
(let ((relations              first(spec))
      (non-numeric-attributes  second(spec))
      (numeric-attributes      third(spec))
      (averageble-attributes   fourth(spec))  ;same as computable attributes
      (relation-key-pairs      fifth(spec))   ;same as identifying attributes
      (attributes              sixth(spec)))
      (relationships           seventh(spec)) ;same as 3-way-joins
      (links                   eighth(spec))  ;same as 2-way-joins
<<other categories may be added later>>
;this APPEND will return a list of all the grammar rules
;this may be implemented differently as described above
append(
(loop-for rel in relations if t substitute (rel rel rel) in
("s → ~A-np" ((1))
("s → ~A-attr-constr for ~A-np" ((2 1 3)))
("~A-attr-constr → ~A-attr (attr-and ~A-attr-constr)" ((1))
((2 1 3)))
("~A-np → (modifiable-~A-np ~A-expert)" ((1))
((2)))
("modifiable-~A-np → ~As (~A-mod-construct)" ((1))
((2) (1 2)))
("~A-mod-construct → ~A-mod-and (s-or ~A-mod-construct)"
((1))
((2 1 3)))
("~A-mod-and → ~A-mod-base (s-and ~A-mod-and)"
((1))
((2 1 3)))
("~A-mod-base → ([left-bracket ~A-mod-construct right bracket] ~A-mod)"
((2) (1 2 3))
((4))))
```

TABLE 3

```
(loop for (rel . attrs) in non-numeric-attributes
append (loop-for attr in attrs if t substitute (rel rel attr rel attr) in
("~A-mod → whose-~A-~A-is ~A-~A-expert" ((1 2)))))
(loop for (rel . attrs) in (append numeric-attributes non-numeric-attributes)
append (loop-for attr in attrs if t substitute (rel attr) in
("~A-attr → ~A" ((1)))))
(loop for (rel . attrs) in numeric-attributes
append (loop-for attr in attrs if t substitute (rel rel attr) in
("~A-mod → whose-~A-~A-is comparison-pred number-expert" ((1 2 3)))
("~A-mod → with -~A-~A between number-expert between-and number-expert"
((1 3 5) (1 2 3 4 5)))))
```

TABLE 4

```
(loop for (rel . attrs) in averageble-attributes
append (loop-for attr in attrs if t substitute (rel rel attr rel attr) in
("~A-mod → whose-~A-~A-is comparison-pred avg-~A-~A-np" ((1 2 3))))
(loop for (rel . attrs) in averageble-attributes
append (loop-for attr in attrs if t substitute (rel attr attr rel) in
("avg-~A-~A-np → the-average-~A-of ~A-np" ((1 2)))))
```

TABLE 4-continued

```
(loop-for (r (a1 (phrase . any) a2) (r1 r1-a1)(r2 r2-a2)) in relationships
if phrase substitute (r1 phrase r r1 r2 r2) in
("~A-mod → :~A-~A-~A-~A: ~A-np" ((1 2))))
(loop-for (r (a1 (any . phrase) a2) (r1 r1-a1)(r2 r2-a2)) in relationships
if phrase substitute (r2 phrase r r2 r1 r1) in
("~A-mod → :~A-~A-~A-~A: ~A-np" ((1 2))))
(loop-for ((r1) any1) (phrase . any) (r2 any2)) in links
if phrase substitute (r1 r1 phrase r2 r2) in
("~A-mod → :~A-~A-~A: ~A-np" ((1 2))))
(loop-for ((r1 any1) (any . phrase) (r2 any2)) in links
if phrase substitute (r2 r2 phrase r1 r1) in
("~A-mod → :~A-~A-~A: ~A-np" ((1 2))))
;invariant grammar rules--no substitutions needed
'(
("comparison-pred → (equal-to greater-than less-than greater-or-equal-to
less-than-or-equal-to)"
((1)) ((2)) ((3)) ((4)) ((5)))
)
```

FUNCTION MAKE-SEMANTIC-LEXICON

Formally,

MAKE-SEMANTIC-LEXICON(*portable-spec*-)—semantic-lexicon

The semantic lexicon that results corresponds to the semantic grammar that results from the use of MAKE-PORTABLE-GRAMMAR with the same *portable-spec*.

This section is very similar to the previous section with regard to how out and inner loops and substitution lists instantiate forms. Here each form being substituted into results in a LEXICAL ENTRY consisting of a 4-tuple with fields (category, menu-item, menu-window, translation). The category corresponds to a terminal element in the grammar (that is, it appears on the right hand side, but not on the left hand side, of one or more grammar rules. The menu-item is a string (word or phrase or whatever) to display as an item in some menu-window. The menu-window identifies in which pane a menu-item will appear. (This menu-window component is specificly for use with the NLMENU system and might not be needed in some other sort of grammar-drive, menu-based iterface driver.) And the translation is a possibly parameterized form that is used in combination with the interpretations in the grammar to build up a translation interpretable by the target system. The translations in the lexical entries in the prototype function that follows are translations to CSL's relational dbms at present. Whenever interfacing to a new target database system, only this portion need be re-written.

The same comments made in the previous section apply here regarding storage of the lexicon in some source form, like list form, file form, or relation form, or in some object or compiled form (as when the lexicon represented in the form of several lists in a similar way as has been done inside the NLMENU-driver function in the nlmenu interface).

The lexicon is extensible. More core lexical items will be added. Automatically generated help can be added as a fifth component to each entry. *Other components may be added as the need arises.
*We have done this.

What follows is a pseudo-coded version of the actual Lisp code describing MAKE-SEMANTIC-LEXICON.

TABLE

```
;the expansion macro which instantiates lexicon rule templates
;for completeness only--<<LISP MACHINE SPECIFIC>>
(defmacro loop-thru (a in b if e substitute c in . d)
(loop for lex-quadruple
in (loop for rule in (quote ,d) collect (format nil "~S" rule))
append (loop for ,a in ,b
if ,e
collect (read-from-string (format nil lex-quadruple ,ec)))))
;makes a semantic lexicon from a set of rule templates
function MAKE-SEMANTIC-LEXICON (spec);
;unpack the portable spec list into the named categories (local variables)
(let ((relations              first(spec))
 (non-numeric-attributes      second(spec))
 (numeric-attributes          third(spec))
 (averageable-attributes      fourth(spec))  ;same as computable attributes
 (relation-key-pairs          fifth(spec))   ;same as identifying attributes
 (attributes                  sixth(spec))
 (relationships               seventh(spec)) ;same as 3-way-joins
 (links                       eighth(spec))  ;same as 2-way-joins
 ; <<other categories may be added later>>
 )
;this APPEND will return a list of all the lexical entries
;this may be implemented differently as described above
append(
(loop-thru rel in relations if t substitute (rel rel rel) in
(~As "~As" NOUNS
(%% (RETRIEVE (QUOTE ~A) GIVING (%% (GENSYM))))))
(loop for (rel . attrs) in non-numeric-attributes
append (loop-thru attr in attrs if t substitute (rel attr rel attr rel attr) in
(whose-~A-~A-is "whose ~A ~A is" MODIFIERS
```

TABLE-continued

```
(LAMBDA Y
(%% (RETRIEVE (QUOTE ~A) GIVING (%% (GENSYM))
WHERE (MEM 'EQU-DB ~A 'Y)))))
(~A-~A-expert "<specific ~A ~As>" ATTRIBUTES
(EXPERT (invoke-rel-attr-expert (quote ~A) (quote ~A))))))
(loop-thru (rel key) in relation-key-pairs if t substitute (rel rel rel key) in
(~A-expert "<specific ~As>" NOUNS
(EXPERT (invoke-rel-expert (quote ~A) (quote ~A)))))
append (loop-thru attr in attrs
if t substitute (rel attr rel attr rel attr attr attr attr) in
(whose-~A-~A-is "whose ~A ~A is" MODIFIERS
(LAMBDA Z (LAMBDA Y
(%% (RETRIEVE (QUOTE ~A) GIVING (%% (GENSYM))
WHERE (Z ~A Y))))))
(with-~A-~A "whose ~A ~A is" MODIFIERS
(lambda y (lambda x
(%% (retrieve (quote ~A) giving (%% (gensym))
where (or (and (ge x y) (ge ~A y) (le ~A x))
(and (ge y x) (ge ~A x) (le ~A y))))))))) (loop for (rel . attrs) in averageble-attributes
append (loop-thru attr in attrs if t substitute (attr attr attr) in
(the-average-~A-of "the average ~A of" COMPARISONS
(LAMBDA X (%% (AVG (QUOTE X) (QUOTE ~A)))))))
(loop-thru attr in attributes if t substitute (attr attr attr) in
(~A "~A" FEATURES
(~A)))
(loop-thru ((r1 r1-key) (phrase . any) (r2 r2-key)) in links
if phrase substitute ((intern (string-append r1 "-" phrase "-" r2)) phrase r1
(if (atom r1-key) r1-key (cons 'list r1-key))
r2-key) in
(~S "~A" MODIFIERS
(LAMBDA Y
(%% (RETRIEVE (QUOTE ~A) GIVING (%% (GENSYM))
WHERE (MEMBER ~A (QUOTE (%% (GENTREL 'Y (QUOTE ~A))))))))))
(loop-thru ((r2 r2-key) (any . phrase) (r1 r1-key)) in links
if phrase substitute ((intern (string-append r1 "-" phrase "-" r2)) phrase r1
(if (atom r1-key) r1-key (cons 'list r1-key))
r2-key) in
(~S "~A" MODIFIERS
(LAMBDA Y
(%% (RETRIEVE (QUOTE ~A) GIVING (%% (GENSYM))
WHERE (MEMBER ~A (QUOTE (%% (GENTREL 'Y (QUOTE ~A))))))))))
(loop-thru (rel (r-a1 (phrase . any) r-a2) (r1 r1-key)(r2 r2-key))
in relationships if phrase
substitute ((intern (string-append phrase "-" rel "-" r1 "-" r2)) phrase r1
(if (atom r1-key) r1-key (cons 'list r1-key))
rel
(if (atom r-a2) r-a2 (cons 'list r-a2))
r2-key r-a1) in
(~S "~A" MODIFIERS
(LAMBDA Y
(%% (RETRIEVE (quote ~A) GIVING (%% (GENSYM))
WHERE (MEMBER ~A (quote (%% (GENTREL
(RETRIEVE (quote ~A) GIVING (%% (GENSYM))
WHERE (MEMBER ~A (quote (%% (GENTREL 'Y (quote ~A))))))
(quote ~A))))))))))
(loop-thru (rel (r-a2 (any . phrase) r-a1) (r2 r2-key)(r1 r1-key))
in relationships if phrase
substitute ((intern (string-append phrase "-" rel "-" r1 "-" r2)) phrase r1
(if (atom r1-key) r1-key (cons 'list r1-key))
rel
(if (atom r-a2) r-a2 (cons 'list r-a2))
r2-key r-a1) in
(~S "~A" MODIFIERS
(LAMBDA Y
(%% (RETRIEVE (quote ~A) GIVING (%% (GENSYM))
WHERE (MEMBER ~A (quote (%% (GENTREL
(RETRIEVE (quote ~A) GIVING (%% (GENSYM))
WHERE (MEMBER ~A (quote (%% (GENTREL 'Y (quote ~A))))))
(quote ~A))))))))))
;invariants
'(
(NUMBER-EXPERT "<specific number>" ATTRIBUTES
(EXPERT (invoke-number-expert)))
(ATTR-AND "and" OPERATORS
(lambda x (lambda y (%% (append 'x 'y)))))
(S-AND "and" OPERATORS
(LAMBDA Z (LAMBDA Y
(%% (MEET (QUOTE Z)
(QUOTE Y))))))
(S-OR "or" OPERATORS
(LAMBDA Z (LAMBDA Y
(%% (R-UNION QUOTE Z)
```

TABLE-continued

```
QUOTE Y))))))
(LEFT-BRACKET "[" OPERATORS NIL)
(RIGHT-BRACKET "]" OPERATORS NIL)
(BETWEEN-AND "and" OPERATORS NIL) ;add-on
(BETWEEN "between" COMPARISONS NIL) ;add on
(GREATER-THAN "greater than" COMPARISONS GT)
(LESS-THAN "less than" COMPARISONS LT)
(GREATER-OR-EQUAL-TO "greater than or equal to" COMPARISONS GE)
(LESS-THAN-OR-EQUAL-TO "less than or equal to" COMPARISONS LE)
(EQUAL-TO "equal to" COMPARISONS EQU)
(FOR "of" OPERATORS
(lambda x (lambda y
(%% (retrieve 'y over x giving (%% (gensym))))))))
)
))
end MAKE-SEMANTIC-LEXICON;
```

In the NLMENU system as implemented, experts are segments of code that are exeuctred as the query is being specified by the user. An expert is specified in a lexical entry. A normal lexical entry hsa the form:

```
((grammar terminal) (menu phrase) (menu pane)
(translation (lexical item help))
```

Lexical entries that invoke experts have (translations) of a special form, namely: (translation) is of the form (EXPERT code), that is, a keyword followed by code.

During the parse, when a normal lexical item is selected by the user from some menu, its translation is added to the parse verbatum. In contrast, for experts, the code is executed and it can do arbitrary things but it must return a pair of values: a phrase to add to the sentence being formed and a translation. Since it should be possible to rubout over experts, expert code should not have side-effects.

A simple type-in expert might appear in the lexicon as follows:

```
(supplier-n "(specific supplier)" NOUNS
(EXPERT (list (setq phrase (get-type-in "type a supplier name"))
(list 'quote phrase)))
"Suppliers have name, address, and status attributes. When
the expert pops up, you should type a supplier's name.")
```

The code (setq phrse (get-type-in "type a supplier name")) pops up a type-in window and the user types a supplier name, say "Jones". "Jones" is then used as the next phrase in the sentence and the translation (quote "Jones") is treated as the (translation).

Some particular experts that have been implemented are:

a table expert that looks in the database for key attributes and returns a menu of just the projection of tuples in the relation over the key attributes. So a user might than choose from a menu of all suplier names in the database. The menu phrase is of the form "x" or "x or y" or "x, y, . . . or z" and the translation is of the form '(x y . . . z).

type-in experts, which get the user to type names, filenames, dates, integers, . . .

menu-based popup experts that allow the user to specify dates, units experts (1000 feet), and range experts (male or female).

Many other experts of this kind can be imagined.

It is also possible for experts to be executed only for effect, to set the stage for a later expert, say.

In the BUILD INTERFACEs NLMENU interface, both the MODIFY and the CREATE lexical entries are experts which initialize some global variables whose values are used later in the command by other experts. Such experts involve no explicit interaction with the user as do the ones mentioned above.

One could imagine experts used in other ways as well: a large grammar could be partitioned and experts which were executed for effect could be used to swap from one partition to another.

The function

WELL-FORMEDNESS-TEST (nlmenu-grammar,
nlmenu-lexicon)

invokes a static collection of tests to find bugs in either an automatically generated nlmenu grammar and lexicon pair of a manually-generated one. In addition to returning the following lists:

*lexicon-source-menus*, the set of menu panes mentioned in the third component of the lexicon entries

*lexicon-items*, the set of lexical menu items mentioned in the second component of the lexicon entries

*lexicon-categories*, the set of grammar terminals mentioned in the first component of the lexicon entries

* left-hand-sides*, the set of left-hand sides of grammar rules

*right-hand-sides*, the set of grammar terminals and nonterminals appearing on the right of grammar rules

*grammar-leaves* = grammar right hand sides which are not also left hand sides. In lisp:

```
(subset (function (lambda (x) (not (memq x
*left-hand-sides*))))
(*right-hand-sides*)
``` it finds the following problems:

*unreachable-left-hand-sides* = no right hand side refers to them. In lisp:

```
(subset (function (lambda (x) (not (memq x
*right-hand-sides*))))
*left-hand-sides*)
```

* items-both-nt-in-g-and-cat-in-1* = these items are both non-terminals and lexical categories. In lisp:

```
(subset (function (lambda (x) (memq x
*lexicon-categories*)))
*left-hand-sides*)
```

*undefined-lexicon-items* = these appear as leaves in the grammar but aren't in the lexicon. In lisp:

```
(subset (function (lambda (x) (not memq x
*lexicon-categories*))))
      *grammar-leaves*)
```

*unused-lexical-items* = they are in the lexicon but aren't grammar leaves. in lisp:

```
(subset (function (lambda (x) (not memq x
*grammar-leaves*))))
      *lexicon-categories*)
```

The significance of the WELL-FORMEDNESS-TEST is as follows: As simple as these tests are, I know of no other system that employs such static tests to see if the grammar is well-formed. The tests are extremely helpful in locating several common kinds of bugs in grammar/lexicon combinations. And it is hard to find all such bugs by hand. One might forget to define some lexical categories, or define (misspell) categories that the grammar can't access. Or one might write rules such that the left hand side is not accessible from the root.

This test is obviously useful for manually generated interfaces, but it is also useful for testing and debugging changes made to core grammars and lexicons.

In addition, the test can be used as follows: One of the values returned by WELL-FORMEDNESS-TEST (grammar, nil) is a list of all lexical categories that the grammar writer must write lexical entries for. So the test can be used at grammar writing time.

The WELL-FORMEDNESS-TEST was used in the development of the GUIDED SQL interface as well as in debugging the various core grammar/lexicon pairs, specifically the ones with translations to SQL and the lisp machine relational dbms. The code is included in an appendix.

ADVANTAGES AND SACRIFICES

Listed below are 5 advantages and one sacrifice.

The first advantage is that an end user can easily build and maintain his own natural language interfaces covering his own application domain. A portable-spec is a straightforward data structure and it is no harder to build one than it is to create the set of relations in the first place (and this is an easy process in modern relational databases). As explained above, the process of getting the information for use in a portable-spec is independent of the way the MAKE-PORTABLE-INTERFACE function works. Below, I will briefly outline an interface being built for eliciting the information contained in a portable spec from a user and from the data dictionary of a dbms. As for maintaining such an interface when new columns are added to tables or new tables are added or deleted, etc, one need only modify the portable spec to reflect the changes and regenerate the interface.

The second advantage is that the interface builder can control the coverage. He can decide to make an interface that covers only a semantically related subset of his tables. He can choose to include some attributes and hide other attributes so that they cannot be mentioned. He can choose to support various kinds of joins with natural language phrases. Etc. (It will soon be the case that the interface builder can mirror the access rights of a user in his interface, so that it will allow him to insert, delete, and modify as well as just retrieve and only from those relations that he has the specified privileges on.)*

*It is now the case...

A third, related advantages is that a user can have several such nlmenu interfaces. Each gives him a user-view of a semantically related set of data. This notion of a view is like the notion of a database schema found in network and hierarchical but not relational systems. In relational systems, there is no convenient way for loosely grouping tables together that are semantically related. Furthermore, an nlmenu interface can be treated as an object and can be GRANTed to other users, so a user acting as a database administrator can make nlmenu interfaces for classes of users too naive to build them themselves (like executives).

The fourth advantage is that the interface will be bug free if the portable spec is well-formed syntactically and semantically. If specified relations really are tables in the database and numeric attributes really name attributes with numeric domains, etc, hen the spec refers to a real database and the grammar and lexicon resulting from the MAKE-PORTABLE-SPEC function will define a bug-free interface. Furthermore, the interface is provably correct if the spec is correct (that is, if the integrity constraints listed above hold) and it is easy to check that they do. A static test of the well-formedness of generated grammars and lexicons in included in Appendix A (the function call WELL-FORMEDNESS-TEST). With it, we can show that generated interfaces are statically correct. The core grammar has been tested extensively and by the usual software testing argument, it is bug-free. We have not yet completed a formal proof that the software is correct, since details of the embodiment will affect such a proof and the embodiment is subject to modifications as explained below. Such a proof goes something like this: covered functionality in target language (SQL or LMRDBAAS) is identified and then natural language constructions are identified that translate to those identified target functions. No proof of naturalness of an interface language possible; the naturalness of the interface language can only by ascertained by human factors testing or by reference to known results of human factors tests. (See the next section on experiments).

The fifth advantage is that even if an automatically generated interface is for some reason not quite what is needed for some application, it is much easier to first generate an interface this way and then modify it to suit specific needs than it is to build the entire interface by hand. This has been demonstrated already in the prototype where an automatically generated interface requested by the EG of TI was manually altered to provide a way to specify picture drawing functionality to an NLMENU interface. Another very straightforward alteration is when menu-items that were automatically generated are replaced by a user with more natural sounding lexical items (as when a menu-item "whose part location is" is replaced by the phrase "which are located in"). This sort of modification has been demonstrated in a prototype system that CSL is building for the DSG product.

Taken together, the advantages listed above pave the way for low cost, maintainable interfaces to relational database systems. All of the advantages are novel when considered with respect to prior art.

The only sacrifice made to achieve the advantages listed above is that the core grammar and lexicon are special purpose in that they cover only a limited subset of English. So they cannot be used with an old-style natural language system. But of course, they were designed to be used with a menu-based, grammar-driven interface so this is not really much of a sacrifice.

EXPERIMENTS. Ken Ross and Jim Miller (both MTS's in CSL at TI) conducted a series of human factors experiments using versions of the prototype grammar and lexicon written by Rick Saenz for the supplier-parts database (an example taken from (Date, 1977, p. 79)). Craig Thompson abstacted out a core grammar and lexicon as described above which took advantage of most of the findings of that report. At the present time, however, the important finding involving the ability to return attributes from more than one relation has not been fully implemented, though an implementation is in progress Below, we list specific, planned extension and tests of the MAKE-PORTABLE-INTERFACE function that extend its utility to a broader class of relational database applicatons, and then I list potential applicaton areas other than relational databases where the principles of the invention might be used.

SPECIFIC EXTENSIONS AND TESTS

Specific extensions and tests of the MAKE-PORTABLE-INTERFACE function fall into 6 classes: extensions to the grammar, extensions to the lexicon for interfacing to different relational databases and for generating nlmenu-based help, extensions to the portable spec, an nlmenu-driven interface for guiding the user in building and manipulating portable spec's, human factors testing and proofs of coverage.

(i) Extensions to the core grammar

The specific embodment of the MAKE-PORTABLE-INTERFACE function described above covers only a part of the retrieval functionality of one specific formal relational database interface language. The following extensions that will better cover target dbms' functionality are planned and in progress:

1. The "universal projection" problem involves a solution to the problem of a natural way to allow users to specify precisely what attributes they want returned when specifying a query. A general solution plus several particular solutions are being prototyped at CSL.

2. At present generated interfaces only allow users to specify joins that they explicitly specified in the portable spec. A more general facility for allowing users to specify arbitrary joins in planned. Phrasing the find-parts-whose part# is-equal to-the part# of-shipment would allow such joins.

3. At present, the system does allow natural language update to the database. Natural language INSERT, MODIFY, DELETE commands are being prototyped by SCL for DSG.

4. Core grammar translations to SQL has been prototyped by CSL for DSG.

5. Extensions to handle other aggregate operators like TOTAL, and format specifying operations like ORDERing rows are being added.

6. Subject to prototyping, the grammar of conjunction may change.

7. This is an open-ended list.

(ii) Extensions to the core lexicon

1. A facility for editing menu-items has been added.

2. Automatically generated help has been added as a fifth component to the lexicon. (This help will be present with each lexical item and will be available to the user of an interface who wants an explanation of particular phrases.) There will be a facility for editing this item-help.

3. Translations to languages other than CSL's dbms are planned; specifically, an interface to SQL has been demonstrated.

4. Translations from languages other than English can easily be implemented.

5. Changes in the functionality of the core grammar will be reflected by changes in the core lexicon, so this list is open-ended too.

(iii) Extensions to the portable spec

The portable spec will be extended to capture more semantic situations. The portable spec is extensible, but changes to it affect both the core grammar and lexicon and the Build Interface mentioned in the next subsection. Some of the planned extensions include:

1. Allow a portable spec to specify that one relation inherits selected attributes from another (as when a PLANES (plane#, plane-type, captain, . . . ) table of specific airplanes inherits attributes WEIGHT, MANUFACTURER, . . . from a relation PLANE-TYPES (plane-tupe, weight, manufacturer, . . . )) so that phrases like "planes whose weight is" are allowed.

2. Extend 3-way joins to n-ary relationships, like "customers WHO PURCHASED parts FROM suppliers".

3. Add extensible support for units like fee, pounds, . . . including support for unit conversion.

4. Add extensible support for Attribute Groups like names (composed of first and last names, dates, addresses, . . . . This includes some sort of suppot for formatting such groups.

5. Add support for semantic domains, fixed value ranges (as in (January, 111, December), domain ordering predicates, domain tests, default values, 6. Add user titles for column headings, so descriptive headings are used instead of short fixed length names that are required for some existing databases.

7. Add user defined phrases like "who are male" (which replaces "whose sex is (specific sex expert)")

8. Add support for transitive closures as in "find all managers and their managers and so on".

9. Add a define facility so one can say Define—(moun type in)—TO BE—(NP) as in Define—old employee—TO BE—employees whose age is greater than 65.

10. . . . This list is very open-ended.

(iv) An nlmenu-driven user interface for building specs

Work in progress at CSL involves prototyping an interface that allows a user to specify or modify or otherwise operate on a portable spec or interface. The interface will itself be an NLMENU driven interface consisting of a grammar and lexicon and nlmenu-windows necessary to define the user interaction which results in defining a new nlmenu portable spec, modifying or dropping an old one, granting an nlmenu interface to another user of revoking it, or editing menu-items and menu-help.*

*An extensive description appears in the accompanying document.

(v) Proofs of correctness

When proposed extensions of the core grammar and lexicon and the portable spec are completed, I plan to prove that the core grammar covers the selected functionality of its target system in a manner outlined above.

APPLICATION AREAS OTHER THAN RELATIONAL DATABASES

Generating interfaces to hierarchical or network or other databases or to a single file databases:

There is every reason to believe that translations written for a relational system would be replaced by equivalent translations for a newtwork or hierarchical or other dbms. Specifically, Ullman (Ullman, 1980) shows that the basic functionality of the major database models is the same. If a target system does not support some important operation like JOIN (of two tables or files to return another), then the interface simply will not support joins. If semantic domains are not supported, then the portable spec can be simplified accordingly. If only single files are interfaced to, then that's just a special case of a portable spec with only one table.

The process by which an unskilled user constructs a portable specification for a natural language menu interface will now be described with reference to the example shown in FIGS. 1-11. The relevant database must initially be loaded into the system. The database will contain a set of relational tables. (The relational tables can be real or virtual, i.e. recreated ad hoc from existing tables.)

First, the user is offered a selection of functions which can be performed, such as create interface, drop interface, grant access to interface, etc. When an interface is created, the create command is used, and a name is assigned to the interface (in this case "demonstration").

At this point the "using" command is used to introduce the "(cover table)" expert. This first critically important operation lets the user specify which of the tables in the available database are to be used. Thus, the user uses the tables selection to assemble a group of related tables from his database. A common difficulty with well-used databases is that they accumulate a huge number of unrelated data tables, and a process which in effect permits selection of a subset of related tables from the whole database provides substantial processing economies.

Next, the identifying attributes of importance for each of the relations are identified, as are key identifying attributes. For example, the identifying attributes of a pitcher would include his team, ERA, etc. A key identifying attribute of a pitcher would be his name.

A next critical step is arbitrating the access of various users to the interface being constructed. It is extremely useful, in forming and controlling a database, to be able to permit some users partial access. That is, some users should be permitted to look at, but not to modify, some tables. The system of the presently preferred embodiment includes an access check off table, whereby the person creating the table can define who has access to that table, and for what purposes.

Attributes are then classified, by a further expert procedure, as numeric, non-numeric, computable, or omissible. For example, an attribute such as a batter's hitting average can be computed from his at-bats and hits, and therefore need not be stored separately. It should also be noted that the expert for attribute classification will pop up a list of all possible attributes for each classification, and the user will typically desire not to include some of these attributes in the interface.

The next step, and a very important one, is a definition of table joins. For example, in the example shown in FIG. 10, a relation between pitchers and teams is specified, together with the natural-language phrases which will call up this relation. For example, a transition from a set of teams to the set of batters of those teams can be stated by the relation as "whose players are), and a transition from a set of pitchers to their teams can be described as "who play for").

It should be noted that the terminology produced by the automatic interface generating method of the present invention may be somewhat awkward. However, it is easy to subsequently go back and edit awkward terminology, without changing the underlying structure of the correspondence between the natural language command and executable machine command. It should be noted that even somewhat awkward locutions, when they appear in a menu for selection, will be clearer. Thus, for example, if a user has entered "find pitchers" and the menu of active items includes "whose pitcher-ERA is", their relation is easily understood. It should also be noted that, after each table join is entered by the user, that table join is entered in the portable specification.

Thus, after a portable specification has been constructed in this manner, it can be stored. As noted, whenever this interface is called up thereafter, the portable specification will be used to regenerate a grammar and lexicon, the well-formedness test will be applied, and the natural language menu interace will then be up and running.

It will be obvious to those skilled in the art the present invention can be practiced in a wide variety of modifications and variations, and the scope of the present invention is not limited except as defined by the following claims.

APPENDICES

The description of the invention incorporates the following appendices:

Appendix A is a listing of the actual code which is used, in the presently preferred embodiment of the present invention, on an LMI Lisp Machine. This code is in LISP, with comments.

Appendix B sets forth a sample database, such as might be provided to the present invention for tranlation into a user-customized interface. This appendix also contains a sample of a portable spec in a generated grammar and lexicon, such as might be generated, by the present invention, from this database.

What is claimed is:

1. A method for generating a context-free grammar comprising the steps of:
    (a) generating a domain-independent core grammar;
    (b) generating a domain-independent core lexicon;
    (c) generating a domain specification directed to a predetermined application; and
    (d) inserting the domain specification into the domain-independent core grammar and lexicon to define a domain dependent context-free grammar.

2. The method of claim 1, wherein the domain dependent context-free grammar is suitable for use as a predictive grammar and parser in a natural language menu system.

3. The method of claim 2, wherein step (d) is done independently from and prior to execution of the natural language menu system.

4. A method for generating a grammar for use as a predictive grammar and parser in a natural language menu system, comprising the steps of:
    (a) generating a domain-independent core grammar;

(b) generating a domain-independent core lexicon;

(c) generating a domain specification directed to a predetermined natural language menu application; and (d) combining the results of steps (a), (b) and (c) into a domain dependent grammar by instantiating the unbound portions of the domain-independent core grammar and lexicon with the data contained in the domain specification.

5. The method of claim 4, wherein step (d) is done independently from and prior to execution of the natural language menu system.

6. A system for generating a context-free grammar suitable for use as an input to a natural language menu system, comprising:

an input file containing a definition for a domain-independent context-free grammar;

an input file containing a definition for a domain-independent lexicon;

a file containing a domain specification which is specific to a preselected application to be run under the natural language menu system;

a processor coupled to the grammar and lexicon input files and to the domain specification file, wherein the domain specification file is merged with the grammar and lexicon input files to create a domain dependent context free grammar.

7. The system of claim 6, further comprising an output file coupled to the processor for receiving the domain dependent context free grammar, wherein the output file is further used as an input file to the natural language menu system.

8. A system for generating a user customized natural language menu interface from a database supplied by the user and from inputs supplied interactively by a user, comprising:

display means for showing to a user expert a menu of options;

input means coupled to said display means, for moving a cursor's apparent position on said display means by the action of said user;

means for the system to access said data base;

means for displaying on said displaying means a generalized relation between two or more tables in said database, with generalized indications of corresponding natural-language connecting phrases;

means for interactively receiving from said user a plurality of said relations between tables in said database, together with natural-language connecting phrases corresponding to said relations between tables and said database; and means for integrating said relations interactively selected by said user into a portable specification for natural-language-menu interface and for storing said portable specification.

* * * * *